(12) United States Patent
Shibao

(10) Patent No.: US 12,160,551 B2
(45) Date of Patent: Dec. 3, 2024

(54) IMAGE PROCESSING APPARATUS, METHOD FOR CONTROLLING IMAGE PROCESSING APPARATUS, AND INFORMATION PROCESSING APPARATUS FOR DISPLAYING PREVIEW IMAGE

(71) Applicant: CANON KABUSHIKI KAISHA, Tokyo (JP)

(72) Inventor: Mayumi Shibao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/462,498

(22) Filed: Sep. 7, 2023

(65) Prior Publication Data
US 2024/0089382 A1  Mar. 14, 2024

(30) Foreign Application Priority Data
Sep. 9, 2022 (JP) ................................. 2022-143743

(51) Int. Cl.
*H04N 1/00* (2006.01)

(52) U.S. Cl.
CPC ....... *H04N 1/0044* (2013.01); *H04N 1/00307* (2013.01)

(58) Field of Classification Search
None
See application file for complete search history.

(56) References Cited

U.S. PATENT DOCUMENTS
2015/0138587 A1   5/2015   Hiramatsu

FOREIGN PATENT DOCUMENTS
JP   2015097031 A   5/2015

*Primary Examiner* — Lennin R Rodriguezgonzalez
(74) *Attorney, Agent, or Firm* — ROSSI, KIMMS & McDOWELL LLP

(57) ABSTRACT

An image processing apparatus capable of communicating with an information processing apparatus includes: a reception unit configured to receive job information including a setting for displaying a preview from the information processing apparatus; and a control unit configured to transmit a preview image data based on the job information to the information processing apparatus in a case of receiving the job information.

17 Claims, 20 Drawing Sheets

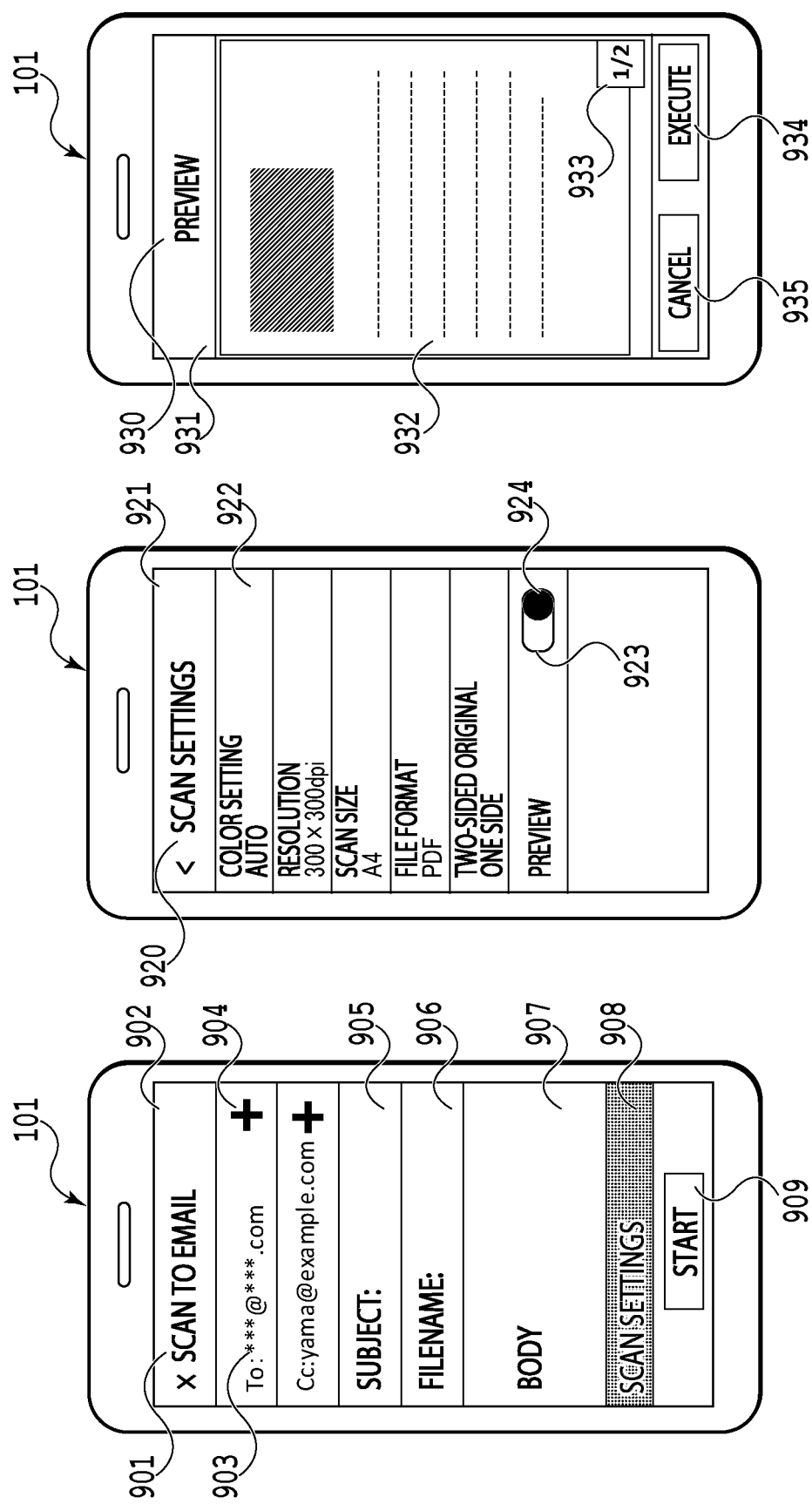

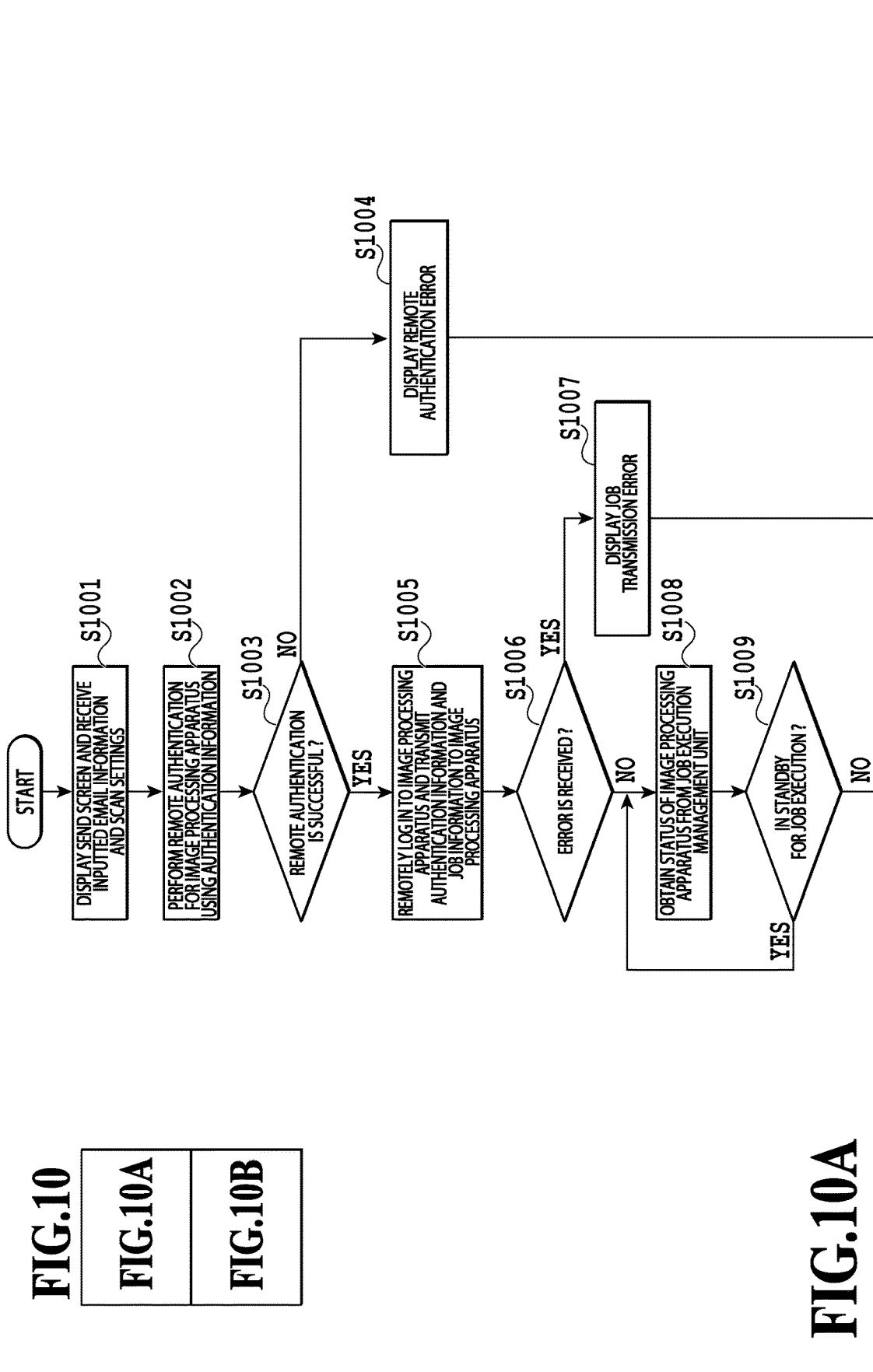

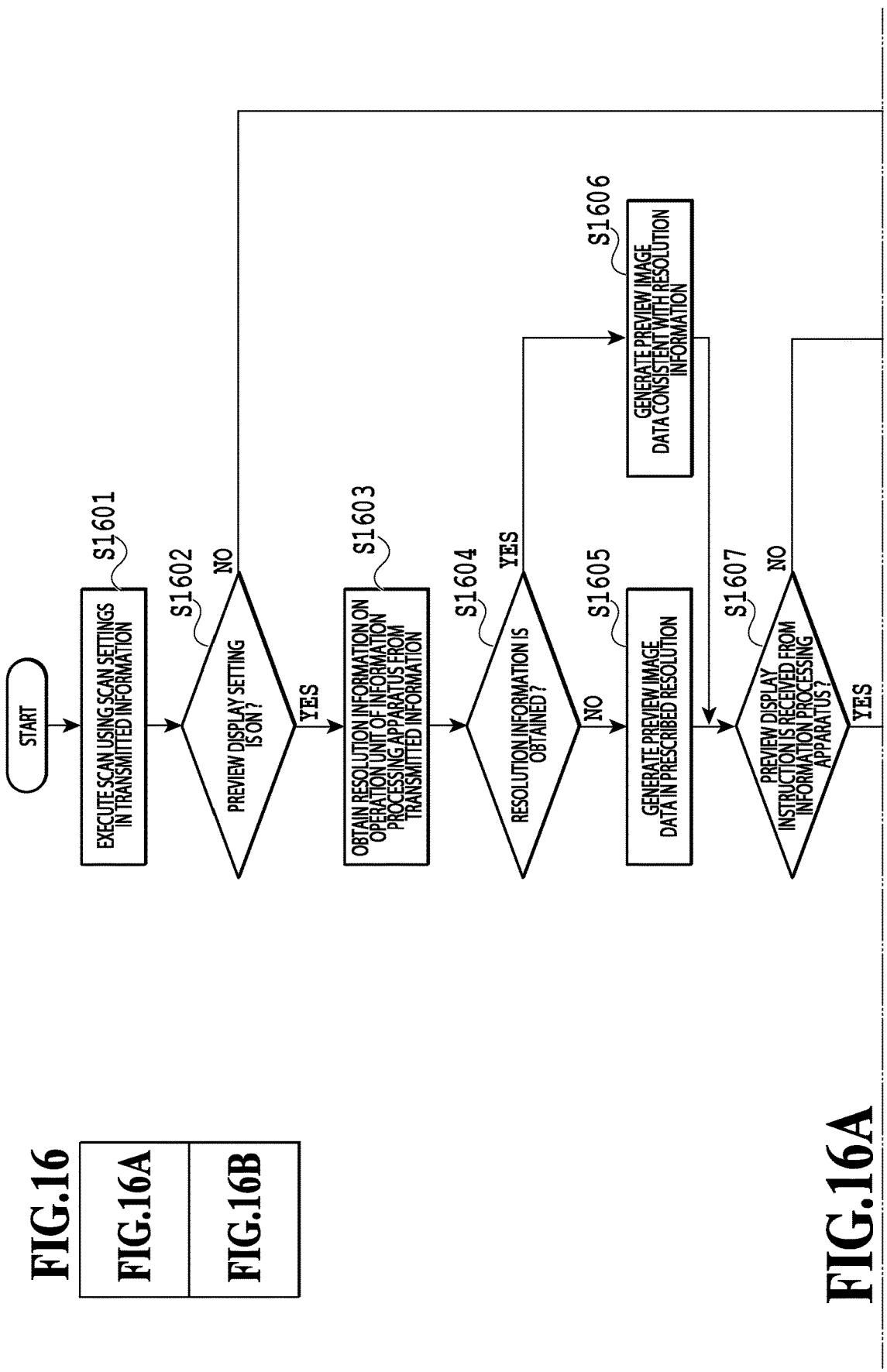

IMAGE PROCESSING APPARATUS, METHOD FOR CONTROLLING IMAGE PROCESSING APPARATUS, AND INFORMATION PROCESSING APPARATUS FOR DISPLAYING PREVIEW IMAGE

BACKGROUND OF THE DISCLOSURE

Field of the Disclosure

The present disclosure relates to a technique for display a preview of an image data.

Description of the Related Art

An image processing apparatus includes various functions such as a scan function, a print function, a copy function, a network function, a fax function, and a preview function. Taking the preview function as an example, before a scanned image data is printed or emailed, the image processing apparatus displays a scanned image on an operation panel. As a result, a user can confirm whether the scan image will come out as desired.

Japanese Patent Laid-Open No. 2015-097031 (hereinafter referred to as Document 1) discloses a technique in which, in an event where a mobile terminal transmits a pint job to an image processing apparatus, the image processing apparatus displays a preview image either on an operation panel of the image processing apparatus or on a display unit of the mobile terminal, depending on a setting indicating whether displaying a preview on the image processing apparatus itself is enabled.

In the approach in Document 1, in a case where the image processing apparatus has a setting indicating that the image processing apparatus displays the preview image, the preview image is displayed not on the mobile terminal, but on the operation panel of the image processing apparatus. Thus, a technique for improving usability in displaying the preview image is requested.

SUMMARY OF THE DISCLOSURE

An image processing apparatus according to the present disclosure is an image processing apparatus capable of communicating with an information processing apparatus, the image processing apparatus including: a reception unit configured to receive job information including a setting related to displaying a preview from the information processing apparatus; and a control unit configured to transmit a preview image data based on the job information to the information processing apparatus in a case of receiving the job information.

Further features of the present disclosure will become apparent from the following description of exemplary embodiments with reference to the attached drawings.

BRIEF DESCRIPTION OF THE DRAWINGS

FIGS. 9A to 9C are diagrams showing examples of a screen on the information processing apparatus;

DESCRIPTION OF THE EMBODIMENTS

Figure 1:
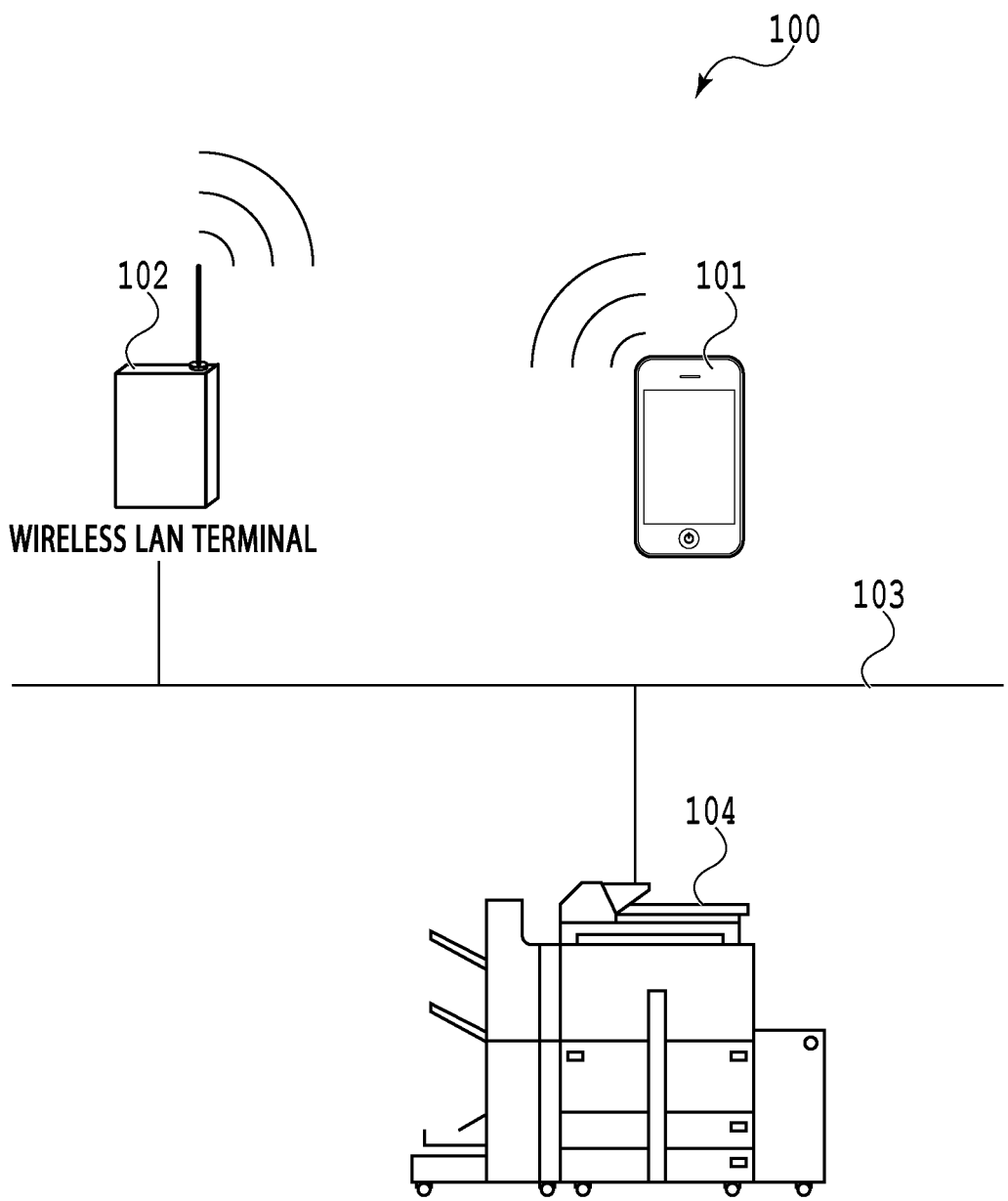
FIG. 1 is a block diagram showing a system configuration of an information processing system.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

First Embodiment

FIG. 1 is a block diagram showing a system configuration of an information processing system according to a first embodiment. An information processing system 100 includes an information processing apparatus 101, a wireless LAN terminal 102, and an image processing apparatus 104. The information processing apparatus 101 is connected to the image processing apparatus 104 via a network 103 such as a local area network (LAN). Apparatuses other than these may also be connected to the network 103.

The information processing apparatus 101 is, for example, a mobile terminal such as a smartphone, but may be an apparatus on which an operating system for small terminals, and programs for controlling voice calling, position detection and data communication run. Alternatively, the information processing apparatus 101 may be a personal computer (PC) including a touch panel and a display panel. Also, the information processing apparatus 101 is connected to the network 103 via the wireless LAN terminal 102.

The wireless LAN terminal 102 is a wireless LAN base unit having a typical network router function, and provides a wireless communication service for homes, offices, and the like.

The image processing apparatus 104 is a multifunction machine including various functions such as a printer function, a copier function, a scanner function, a fax function, and a preview display function. However, the image processing apparatus 104 is not limited to this and may be an apparatus having one of such functions. The image processing apparatus 104 may include a wireless communication access point inside and be configured to be able to communicate with the information processing apparatus 101 directly.

From the information processing apparatus 101 communicating with the image processing apparatus 104, a user can instruct the image processing apparatus 104 to execute a job to have the image processing apparatus 104 execute various functions. Note that in the first embodiment, the image processing apparatus 104 is connected to the network 103 in a wired manner. The image processing apparatus 104, like the information processing apparatus 101, may be connected to the network 103 in a wireless manner using the wireless LAN terminal 102.

Further, the information processing apparatus 101 and the image processing apparatus 104 can perform short-range wireless communications such as near-field communication (NFC) or Bluetooth Low Energy (BLE) (registered trademark). Via an NFC communication unit or a BLE communication unit to be described later, the image processing apparatus 104 transmits connection information, such as an IP address, for having network connections with the image processing apparatus 104, to the information processing apparatus 101. Then, the information processing apparatus 101 starts network communications with the image processing apparatus 104 using the connection information thus acquired.

Figure 2:
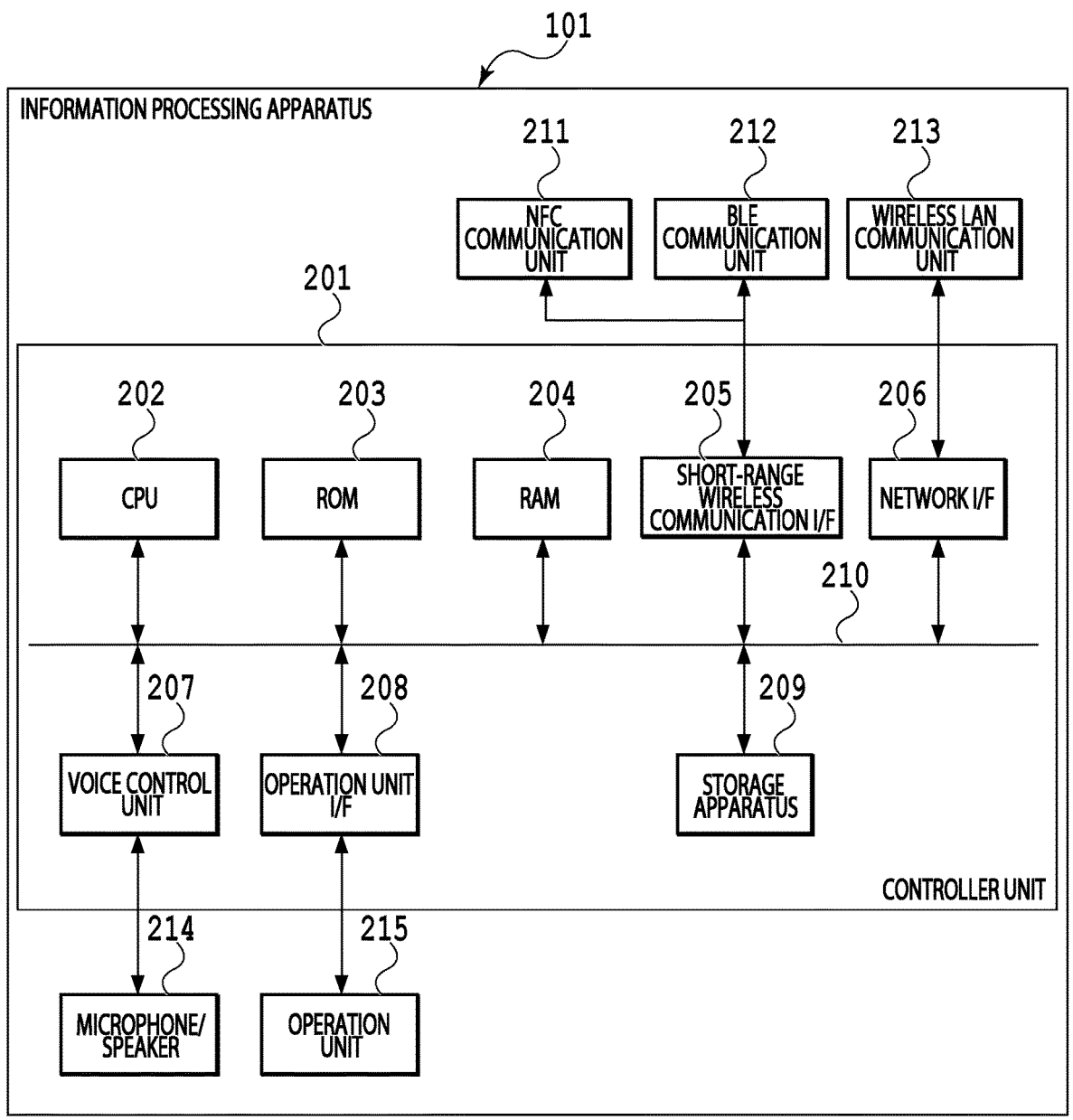
FIG. 2 is a block diagram showing a hardware configuration of an information processing apparatus.

FIG. 2 is a diagram of a hardware configuration of the information processing apparatus 101 according to the first embodiment. The information processing apparatus 101 includes a controller unit 201. The controller unit 201 includes a CPU 202, a ROM 203, a RAM 204, a short-range wireless communication OF 205, a network I/F 206, a voice control unit 207, an operation unit OF 208, and a storage apparatus 209, and they are connected to one another via a system bus 210.

The controller unit 201 controls various communication units, namely an NFC communication unit 211, a BLE communication unit 212, and a wireless LAN communication unit 213, as well as various UI units such as a microphone/speaker 214 and an operation unit 215.

The CPU 202 controls the entire system of the information processing apparatus 101.

The ROM 203 stores therein an operating system for the information processing apparatus 101 and programs for controlling calling, data communication, and the like, and the CPU 202 executes the various programs stored in the ROM.

The RAM 204 is used as main memory of the CPU 202 and a temporary storage region such as a work area.

The short-range wireless communication OF 205 is connected to the NFC communication unit 211 and the BLE communication unit 212. The information processing apparatus 101 performs short-range wireless communications with the image processing apparatus 104 using the NFC communication unit 211 or the BLE communication unit 212.

The network OF 206 is connected to the wireless LAN communication unit 213. The information processing apparatus 101 performs wireless communications with the wireless LAN terminal 102 using the wireless LAN communication unit 213 and thereby connects to the network 103.

The voice control unit 207 controls input and output of voice data via the microphone/speaker 214.

The operation unit I/F 208 connects the operation unit 215 to the controller unit 201 and performs data input/output control on the operation unit 215. The operation unit 215 includes a touch panel capable of detecting a user's touch operation and a display panel for displaying various screens.

Various applications executed by the information processing apparatus 101 execute various functions using the voice control unit 207, the operation unit OF 208 and the like.

The storage apparatus 209 is a non-volatile storage apparatus, and stores operation logs, settings of various operation modes and the like that need to be held even after restarting the information processing apparatus 101.

Figure 3:
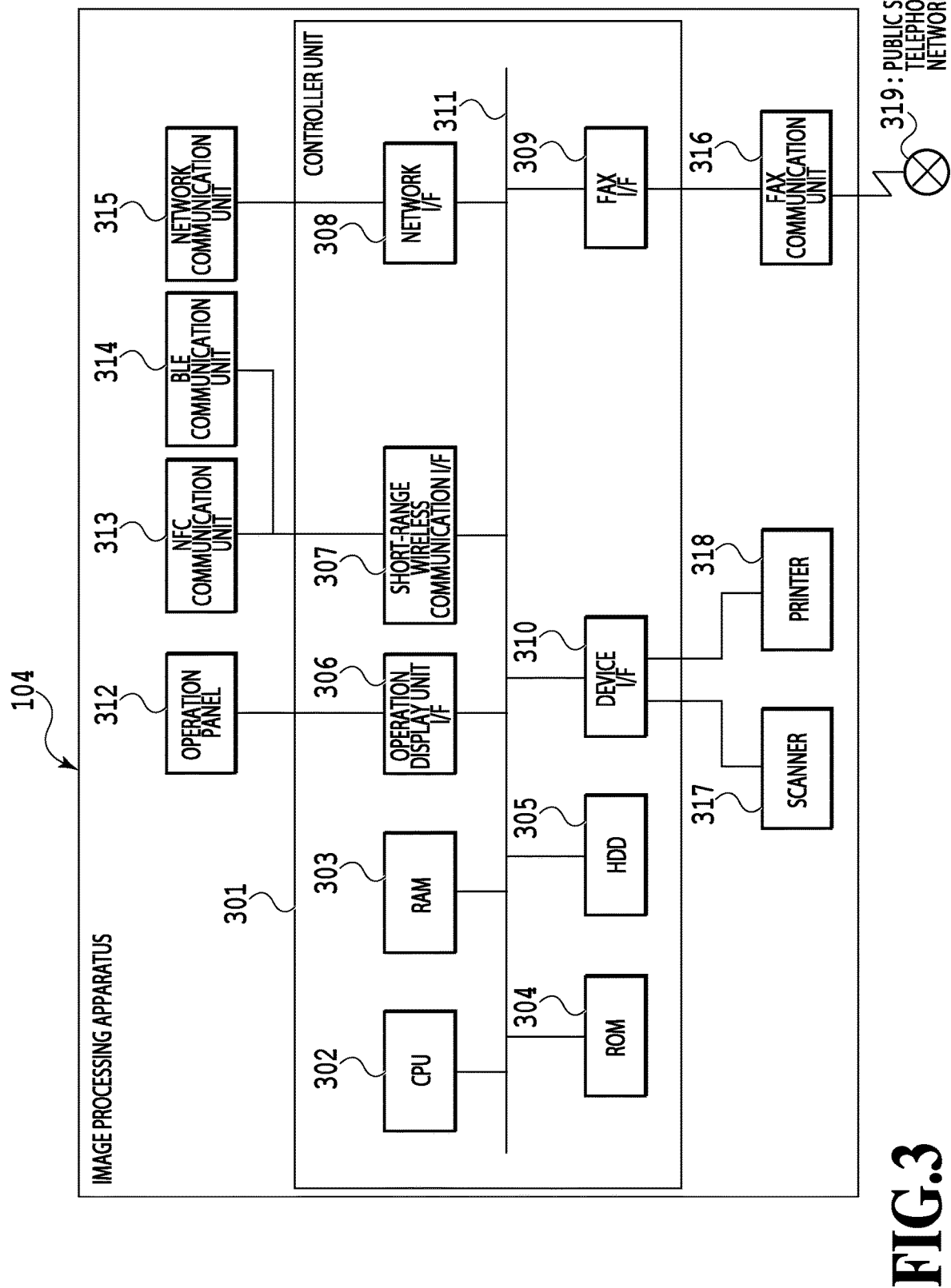
FIG. 3 is a block diagram showing a hardware configuration of an image processing apparatus.

FIG. 3 is a diagram of a hardware configuration of the image processing apparatus 104 according to the first embodiment. The image processing apparatus 104 includes a controller unit 301. The controller unit 301 includes a CPU 302, a RAM 303, a ROM 304, an HDD 305, an operation display unit OF 306, a short-range wireless communication OF 307, a network OF 308, a fax OF 309, and a device OF 310. They are connected to one another via a system bus 311.

The controller unit 301 controls various communication units including an NFC communication unit 313, a BLE communication unit 314, a network communication unit 315, and a fax communication unit 316, as well as an operation panel 312, a scanner 317, and a printer 318.

In a case where the user uses the copy function of the image processing apparatus 104, the controller unit 301 controls the scanner 317 to obtain an image data on an original and controls the printer 318 to print the image data on a sheet of paper and output it.

In a case where the user uses the scan-and-send function, the controller unit 301 controls the scanner 317 to obtain image data on an original and convert the image data into a code data. Then, the controller unit 301 either transmits the code data to a specified information processing apparatus or the like or emails the code data to a specified destination address via the network I/F 308.

In a case where the user uses the print function, the controller unit 301 receives an image data (code data) from the information processing apparatus 101 via the network OF 308. Then, the controller unit 301 transmits the received the image data to the printer 318. Based on the image data received, the printer 318 prints an image on a sheet of paper and outputs it.

In a case where the user uses the fax function, the controller unit 301 performs, via the fax OF 309, fax communications with another apparatus, such as an MFP, which has a fax function and is connected to a public switched telephone network 319 such as ISDN.

To execute one of the functions described above, work to be processed, which is set by the user or the like, is called a job, and the image processing apparatus 104 executes a predetermined job according to job information.

The CPU 302 controls the entire system of the image processing apparatus 104.

The RAM 303 is system work memory for the CPU 302 to operate and temporarily stores image data and the like. Also, the RAM 303 stores scan image data read by the scanner 317 and stores print image data received from the information processing apparatus 101 via the network 103.

The ROM 304 stores the system's boot program, applications, and the like.

The hard disk drive (HDD) 305 stores an operating system, system software, application software, an image data, a setting data, and the like.

The operation display unit OF 306 connects the operation panel 312 to the controller unit 301 and controls data input/output on the operation panel 312. The operation panel 312 detects the user's touch operation and also displays various screens.

The short-range wireless communication OF 307 is connected to the NFC communication unit 313 and the BLE communication unit 314 and communicates information with the information processing apparatus 101 using short-range wireless communications.

The network OF 308 is connected to the network communication unit 315 and communicates information with the information processing apparatus 101 or a cloud server 105 (not shown) using network communications. The image processing apparatus 104 receives the job information, which includes job setting information, the image data, a job execution command, and the like, from the information processing apparatus 101 via the network OF 308 and executes the job.

The fax OF 309 is an interface for controlling the fax communication unit 316. The fax I/F 309 controls a modem for fax communications and a network control unit (NCU) to, e.g., connect to the public switched telephone network 319 and control a fax communication protocol.

The device OF 310 connects the controller unit 301 to the scanner 317 that reads the image data and to the printer 318 that prints the image data and performs input and output of the image data.

Figure 4:
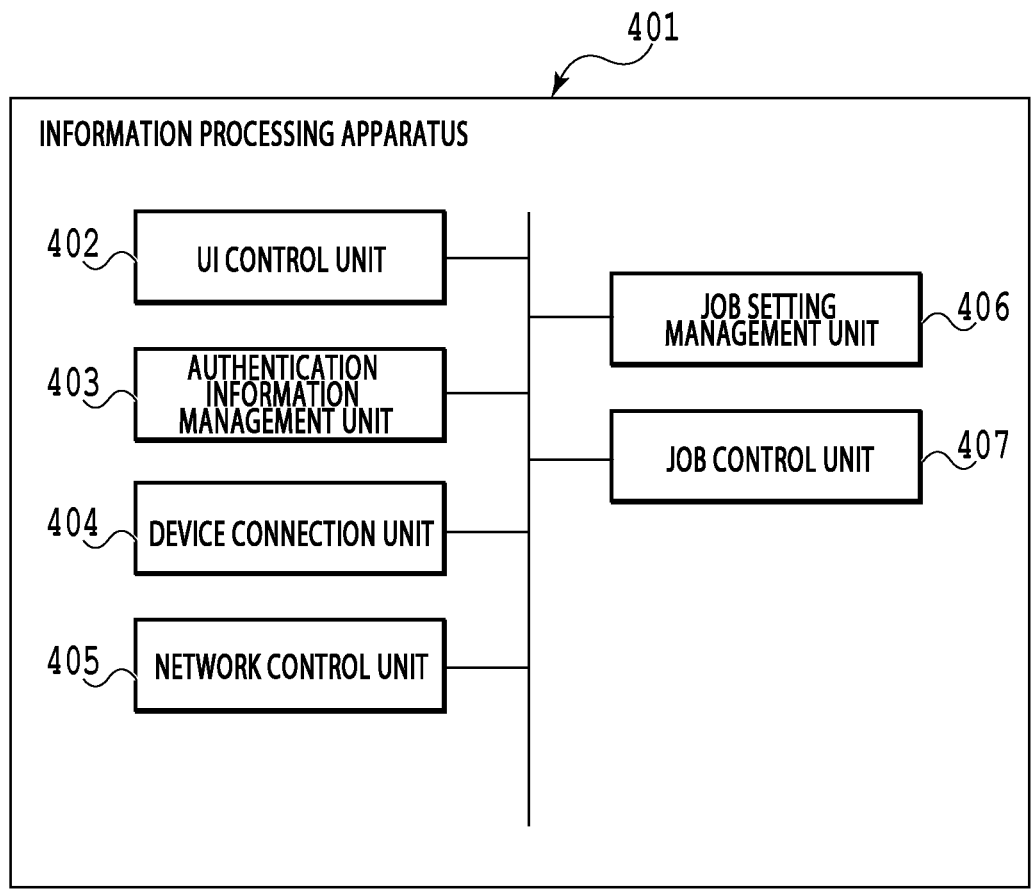
FIG. 4 is a block diagram showing a software configuration of the information processing apparatus.

FIG. 4 is a block diagram showing a software configuration of the information processing apparatus 101 according to the first embodiment and shows functional blocks of software implemented by the CPU 202 by reading control programs stored in the ROM 203 and the storage apparatus 209.

An application 401 is an application installed on the information processing apparatus 101 to operate the image processing apparatus 104. The job information, such as print job information or scan job information, is generated by configuration of settings on the application 401, and the job information is transmitted to the image processing apparatus 104.

Although various applications other than the application 401 are also installed on the information processing apparatus 101, their descriptions are omitted here. The following describes the configuration of the application 401.

The application 401 includes a user interface (UI) control unit 402, an authentication information management unit 403, a device connection unit 404, a network control unit 405, a job setting management unit 406, and a job control unit 407.

The UI control unit 402 receives job setting information and the like inputted by the user on the operation unit 215, and transmits the received content to the job setting management unit 406 and the job control unit 407 via the operation unit OF 208. The UI control unit 402 also receives a response from the job settings management unit 406 and the job control unit 407, and outputs a screen depending on the content received to the operation unit 215 via the operation unit OF 208. Further, the UI control unit 402 receives authentication information for logging in to the image processing apparatus 104, such as the user information, the password, and the like, inputted by the user on the operation unit 215 and transmits the authentication information to the authentication information management unit 403 via the operation unit OF 208.

The authentication information management unit 403 registers the authentication information such as the user information received from the UI control unit 402 and based on the authentication information registered, performs processing to log in to the image processing apparatus 104. Specifically, the authentication information management unit 403 transmits the authentication information to the network control unit 405. The authentication information is transmitted to the image processing apparatus 104 via the network 103. The image processing apparatus 104 performs login processing using the authentication information received, and returns an authentication result to the information processing apparatus 101. The registered authentication information may also be added in a case of transmitting the job information to the image processing apparatus 104.

The device connection unit 404 establishes the short-range wireless communications using NFC or BLE or network communications via the network 103, between the information processing apparatus 101 and the image processing apparatus 104.

In a case of NFC, the short-range wireless communications are started in a case where a user brings the NFC communication unit 211 of the information processing apparatus 101 close to the NFC communication unit 313 of the image processing apparatus 104.

In a case of BLE, the BLE communication unit 314 of the image processing apparatus 104 transmits a BLE beacon, and the BLE communication unit 212 of the information processing apparatus 101 receives the BLE beacon transmitted. In a case where a user brings the information processing apparatus 101 close to the image processing apparatus 104, the radio intensity of the BLE beacon received by the information processing apparatus 101 reaches or exceeds a predetermined level. In a case where it is determined that the radio intensity of the BLE beacon received by the information processing apparatus 101 is the predetermined level or more, the short-range wireless communications using BLE are started between the information processing apparatus 101 and the image processing apparatus 104.

In this way, in a case where the NFC communication units or the BLE communication units of the information processing apparatus 101 and the image processing apparatus 104 are brought close to each other by the user, the device connection unit 404 performs the short-range wireless communications with the image processing apparatus 104. Via the short-range wireless communications, the information processing apparatus 101 obtains device information from the image processing apparatus 104. The device information includes connection information needed for network communications. Using the connection information thus obtained, the device connection unit 404 of the information processing apparatus 101 starts the network communications with the image processing apparatus 104 via the network 103.

The network control unit 405 transmits the job information to the image processing apparatus 104 via the network 103. The job information includes settings information, a job execution instruction command, the image data, the user authentication information, and the like.

In a case of "scan-and-send" job information for emailing scan image data to a specified destination, the job settings information includes a destination to which to send the image data, settings related to scan, and the like.

Further, the network control unit 405 can also receive, the job setting information and the like stored in the image processing apparatus 104 via the network 103.

In the RAM 204 or the storage apparatus 209, the job setting management unit 406 stores the user-inputted job setting information received by the UI control unit 402 and the job setting information received by the network control unit 405 from the image processing apparatus 104. In this event, the job setting management unit 406 may register these pieces of the job setting information as "favorite" settings that the user often uses.

Also, the job settings management unit 406 may register the predetermined job setting information as "preset" settings upon installation of the application 401.

The job control unit 407 controls the processing executed by the image processing apparatus 104. The job information is generated from the job setting information included in "favorite" or "preset" settings registered by the job setting management unit 406 and the job setting information set by user operation, and a job execution instruction to the image processing apparatus 104 is transmitted to the image processing apparatus 104 via the network 103.

Also, the job control unit 407 obtains the job execution status and the operation statuses of the scanner 317 and the printer 318 of the image processing apparatus 104 from the image processing apparatus 104 via the network 103 and transmits them to the UI control unit 402.

Figure 5:
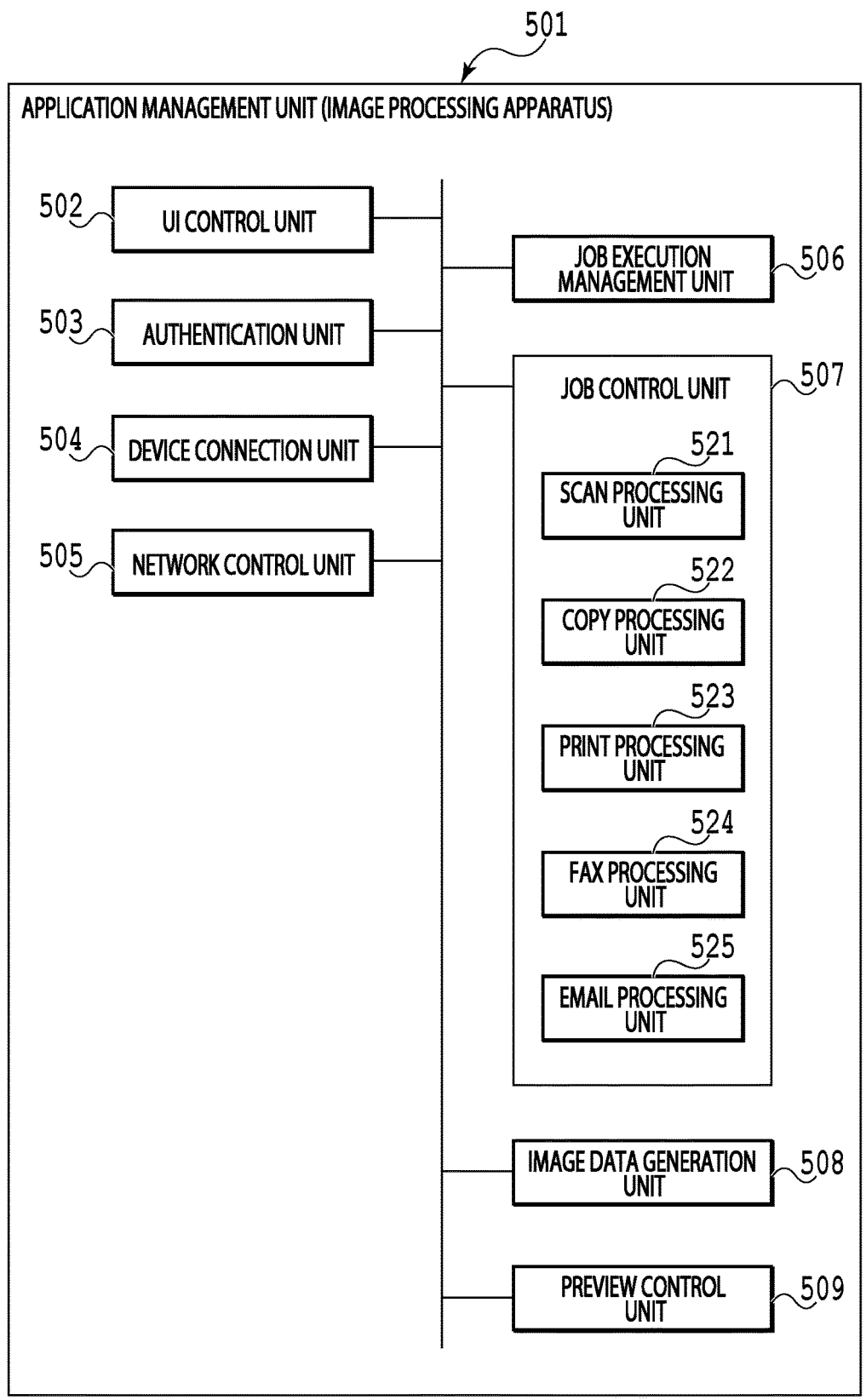
FIG. 5 is a block diagram showing a software configuration of the image processing apparatus.

FIG. 5 is a block diagram showing a software configuration of the image processing apparatus 104 according to the first embodiment, and shows functional blocks of software implemented by the CPU 302 by reading control programs stored in the ROM 304 and the HDD 305.

An application management unit 501 manages an application operating on the image processing apparatus 104.

The application management unit 501 includes a user interface (UI) control unit 502, an authentication unit 503, a device connection unit 504, a network control unit 505, a job execution management unit 506, a job control unit 507, an image data generation unit 508, and a preview control unit 509. The job control unit 507 includes a scan processing unit 521, a copy processing unit 522, a print processing unit 523, a fax processing unit 524, and an email processing unit 525.

The UI control unit 502 receives, the job setting information and the like inputted by a user via the operation panel 312, and transmits this information to the job execution management unit 506 and the job control unit 507.

Also, the UI control unit 502 receives a response from the job execution management unit 506 and the job control unit 507, and outputs a screen based on the response to the operation panel 312.

The authentication unit 503 performs login processing based on the authentication information received from the information processing apparatus 101 and returns the result. The image processing apparatus 104 holds various information on the user who has logged in, such as the user's email address.

The device connection unit 504 establishes the network connections with the information processing apparatus 101. The network control unit 505 receives the job setting information, the job execution instruction command, the image data, the user authentication information, and the like from the information processing apparatus 101 via the network 103.

Further, the network control unit 505 transmits the job setting information, data, and the like stored in the image processing apparatus 104 to the information processing apparatus 101 via the network 103.

The job execution management unit 506 manages the status of the job and the like to be executed and also stores the following information in the RAM 303 and the HDD 305. The information stored includes job-related information and information on an apparatus which constructs the job setting information (a setting apparatus). The job-related information includes the job setting information inputted by the user and received by the UI control unit 502 and the job setting information received by the network control unit 505 from the information processing apparatus 101. In this event, the job execution management unit 506 may register these pieces of job settings information as "favorite" settings often used by the user. Also, the job settings management unit 406 may register the predetermined job settings information as "preset" settings in advance.

Also, the job execution management unit 506 manages a job executed by the image processing apparatus 104 as "history."

The job control unit 507 executes various jobs by controlling the scan processing unit 521, the copy processing unit 522, the print processing unit 523, the fax processing unit 524, and the email processing unit 525 according to the job information received.

The job control unit 507 executes various jobs using the job setting information set by the user on the operation panel 312 or the job setting information registered as "favorite" or "preset" by the job execution management unit 506.

Also, the job control unit 507 receives a job execution request received from the information processing apparatus 101 or the like via the network 103, and executes various jobs according to the job setting information and a job execution instruction received.

Further, the job control unit 507 transmits the job execution status, the operation statuses of the scanner 317 and the printer 318, and the like to the information processing apparatus 101 via the network 103.

The image data generation unit 508 generates the scanned image data in a case where the scan is executed in the image processing apparatus 104.

The preview control unit 509 generates the preview image data from the image data generated by the image data generation unit 508 in a case where the job settings of the job processed by the job control unit 507 include a setting to display the preview image data.

Here, the preview image data refers to the image data generated from the scanned image data with the lower resolution and the smaller image size. Various formats can be used for the preview image data, such as BMP, PNG, or JPEG.

Also, the preview control unit 509 transmits the generated preview image data to the UI control unit 502 or the network control unit 505 based on the information on the setting apparatus, which is managed by the job execution management unit 506.

Figure 6:
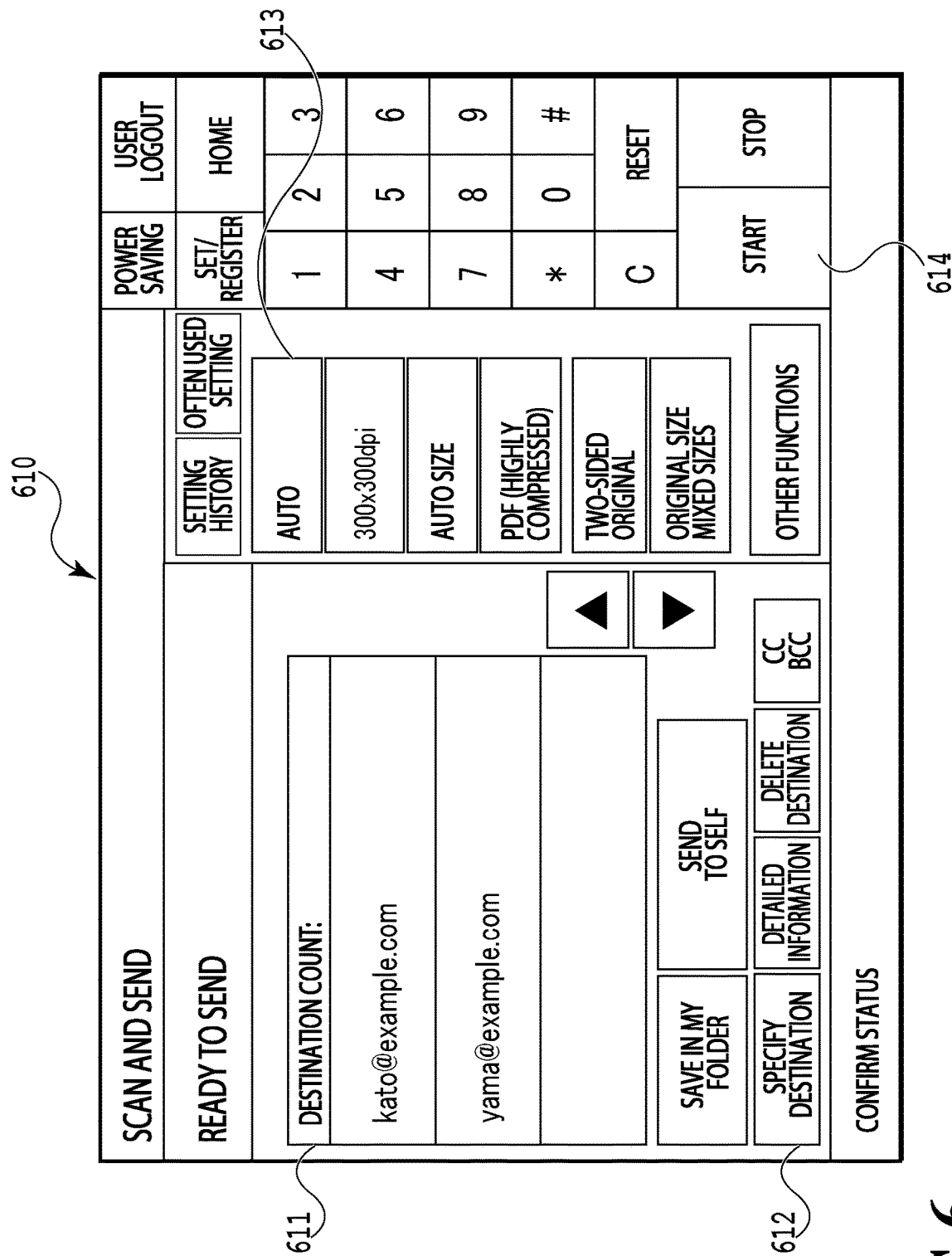
FIG. 6 is a diagram showing an example of a screen displayed on an operation panel of the image processing apparatus.
Figure 7:
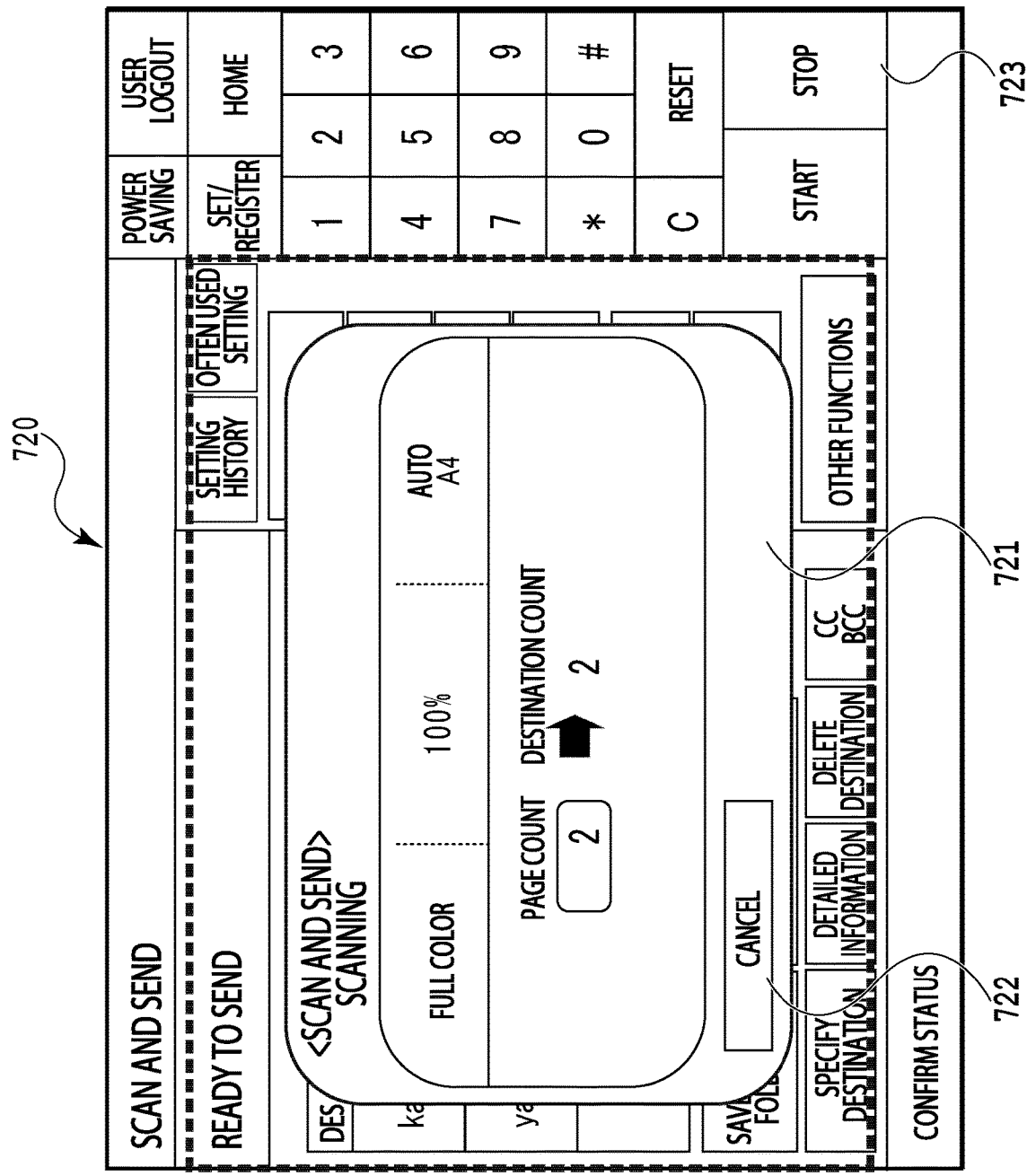
FIG. 7 is a diagram showing an example of the screen displayed on the operation panel of the image processing apparatus.
Figure 8:
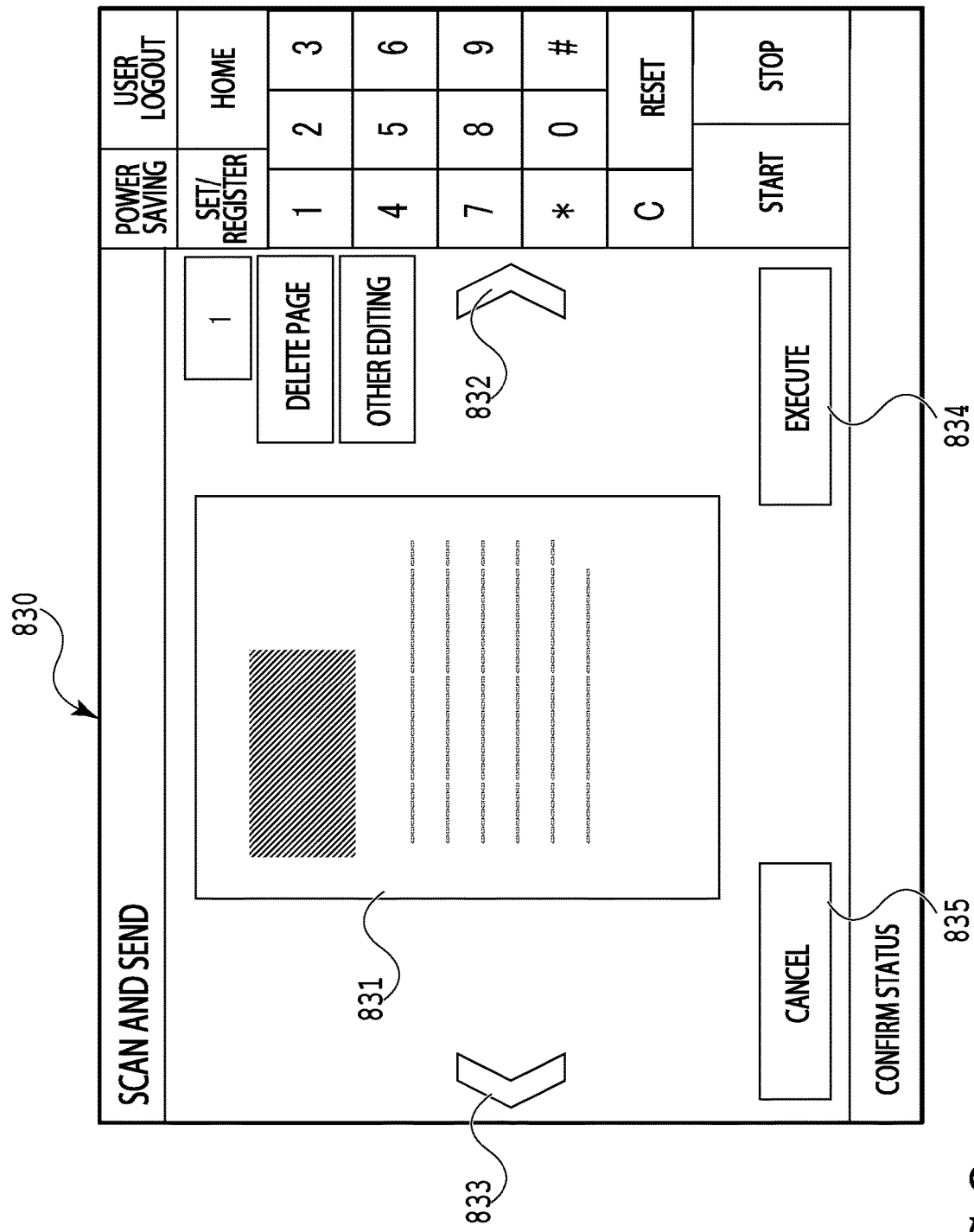
FIG. 8 is a diagram showing an example of the screen displayed on the operation panel of the image processing apparatus.

FIGS. 6, 7, and 8 show screens displayed on the operation panel 312 of the image processing apparatus 104 in a case of executing a "scan-and-send" function combining a scan function and an email function.

FIG. 6 is a diagram showing functions on a "scan-and-send" setting screen of the image processing apparatus 104.

A "scan-and-send" setting screen 610 is a screen to configure the settings for scan and a setting for a destination of the scanned image data. The "scan-and-send" setting screen 610 include a destination field 611, a destination specification button 612, a scan settings region 613, a start button 614, and the like.

Destinations which have been set are displayed in the destination field 611, and the user can confirm destinations of the scan image data.

The destination specification button 612 is a button for specifying the destination of the scanned image data. In a case where the destination specification button 612 is pressed, a list of the destinations is displayed for the user to select a desired email address.

The scan settings region 613 is a region for configuring the scan settings. The user presses the buttons to configure various scan settings.

The start button 614 is a button for executing the processing using the settings configured on the "scan-and-send" setting screen 610. In a case where the user presses the start button 614, the image processing apparatus 104 executes the scan and transmits the scanned image data to the specified destination. In a case where the user presses the start button 614, the operation panel 312 of the image processing apparatus 104 displays a processing-in-progress screen 720 shown in FIG. 7.

FIG. 7 shows a screen displayed on the operation panel 312 of the image processing apparatus 104 while the scan processing is being executed.

The processing-in-progress screen 720 is a screen displaying the execution status of the scan processing. The processing-in-progress screen 720 includes a scan status display dialogue 721, a cancel button 722, a stop button 723, and the like.

The scan status display dialogue 721 is displayed on top of the "scan-and-send" setting screen 610 and shows the scan settings and the number of pages which have been scanned. In a case where the scan display setting is ON, upon completion of the scan operation, a preview screen 830 shown in FIG. 8 is displayed on the operation panel 312 of the image processing apparatus 104.

The cancel button 722 is displayed inside the scan status display dialogue 721. In a case where the user presses the cancel button 722 while the scan status display dialogue 721 is being displayed, the image processing apparatus 104 cancels the scan processing. In a case where the scan processing is cancelled, the processing-in-progress screen 720 is no longer displayed, and either the "scan-and-send" setting screen 610 or a home screen (not shown) is displayed on the operation panel 312.

The stop button 723 is a button for interrupting the scan processing being executed. In a case where the user presses the start button next to the stop button 723 after the scan processing is interrupted, the scan processing is resumed.

FIG. 8 shows a screen where the preview image data is displayed on the operation panel 312 of the image processing apparatus 104.

The preview screen 830 is a screen for displaying the preview image data generated from the scanned image data. The preview screen 830 includes a preview image region 831, a next page button 832, a previous page button 833, an execute button 834, a cancel button 835, and the like.

In the preview image region 831, the preview image data generated from the scanned image data is displayed one page at a time.

The next page button 832 and the previous page button 833 are buttons to switch the page of the preview image data.

In a case where the next page button 832 is pressed by the user, the next page of the preview image data is displayed. In a case where the previous page button 833 is pressed by the user, the previous page of the preview image data is displayed.

The execute button 834 is a button for emailing the scanned image data to a specified destination. In a case where the execute button 834 is pressed by the user, the image processing apparatus 104 executes the processing to send an email attached with the scanned image data to the specified destination.

The cancel button 835 is a button for cancelling the job being executed. In a case where the cancel button 835 is pressed by the user, the image processing apparatus 104 cancels the job being executed, and discards the preview image data and the scanned image data.

FIGS. 9A to 9C show screens displayed on the operation unit 215 of the information processing apparatus 101 upon execution of the scan function. FIGS. 9A to 9C are used to describe the processing for the application 401 executed on the information processing apparatus 101.

FIG. 9A shows a "scan-and-send" setting screen 901 on the information processing apparatus 101.

The "scan-and-send" setting screen 901 is a screen for configuring the settings for emailing the scanned image data, and the "scan-and-send" setting screen 901 includes a title area 902, an email address specifying area 903, an address book activation button 904, a subject field 905, a filename input field 906, a body field 907, a scan settings button 908, and a start button 909.

In the title area 902, the title of the setting screen is displayed. The "x" button displayed at the left end is a button for cancelling the settings and returning to the menu screen (not shown).

The email address specifying area 903 is an area where a specified email address is displayed. In a case where the email address specifying area 903 is pressed by a user, a software keyboard is displayed, allowing the user to input the destination's email address directly.

The address book activation button 904 is disposed at the right end of the email address specifying area 903, and is displayed as a "+" mark in FIG. 9A. In a case where the address book activation button 904 is pressed by the user, the address book stored in the information processing apparatus 101 is called. In a case where the user selects the email address from the address book thus called, the selected email address is displayed in the email address specifying area 903. A plurality of the email addresses can be specified as well.

The subject field 905 is a field for inputting the subject, the filename input field 906 is a field for inputting the filename, and the body field 907 is a field for inputting the body. In a case where the user presses each of these fields, the software keyboard is displayed, allowing the user to input any text.

The scan settings button 908 is a button for configuring scan settings. In a case where the user presses the scan settings button 908, the screen displayed on the operation unit 215 transits to a scan setting screen 920 shown in FIG. 9B.

The start button 909 is a button for transmitting the job information to the image processing apparatus 104.

FIG. 9B shows the scan setting screen 920, which is a screen for configuring the scan settings.

The scan setting screen 920 includes a title area 921, a color setting button 922, a preview select area 923, a preview switch 924, and the like.

A title is displayed in the title area 921. The "<" button displayed at the left end is a button for confirming the settings and returning to the "scan-and-send" setting screen 901.

Various buttons including the color setting button 922 are disposed on the scan setting screen 920. Various settings can be configured by the user's pressing of the buttons.

For instance, in a case where the user presses the color setting button 922, the screen displayed on the operation unit 215 changes to a color setting screen (not shown) in which a color setting can be changed. After the user configures the color setting on the color setting screen, the color setting configured on the color setting screen is displayed on the color setting button 922.

The preview select area 923 is an area for configuring the setting of whether to display the preview image data generated from the scanned image data.

The preview switch 924 is a switch for switching ON and OFF of the preview display. In a case where the preview switch 924 is set to be ON, the preview image data is displayed on the operation unit 215 after the execution of the scan. In a case where the preview switch 924 is set to OFF, the preview image data is not displayed on the operation unit 215 after the execution of the scan, and the processing is performed to display a job information transmission completion screen (not shown) on the operation unit 215.

FIG. 9C shows a preview screen 930, which is a screen for displaying the preview image data.

The preview screen 930 includes a title area 931, a preview area 932, a page number display area 933, an execute button 934, and a cancel button 935.

In the title area 931, a title is displayed.

In the preview area 932, the preview image data received from the image processing apparatus 104 is displayed one page at a time.

In the page number display area 933, the total number of pages in the preview image data and the page number of the page currently displayed are displayed.

A page turning operation for preview image data is performed as follows on the preview screen 930. The next page is displayed on the preview screen 930 in response to the user swiping left on the preview screen 930, and the previous page is displayed on the preview screen 930 in response to the user swiping right on the preview screen 930. Alternatively, the next page may be displayed on the preview screen 930 in response to the user swiping up, and the previous page may be displayed on the preview screen 930 in response to the user swiping down.

It is preferable that the information processing apparatus 101 has received all the preview image data from the image processing apparatus 104 at the time of the execution of the above-described page turning operation for the preview image data. Instead of receiving all the preview image data at one time, the information processing apparatus 101 may receive a piece of the preview image data corresponding to the page to be displayed by the user's swipe from the image processing apparatus 104.

The execute button 934 is a button for sending the email to the destination specified. In a case where the user presses the execute button 934, the information processing apparatus 101 discards the preview image data and notifies the image processing apparatus 104 to start transmission of the email.

The cancel button 935 is a button for cancelling the job. In a case where the user presses the cancel button 935, the information processing apparatus 101 discards the preview image data and notifies the image processing apparatus 104 to cancel the job.

Figure 10B:
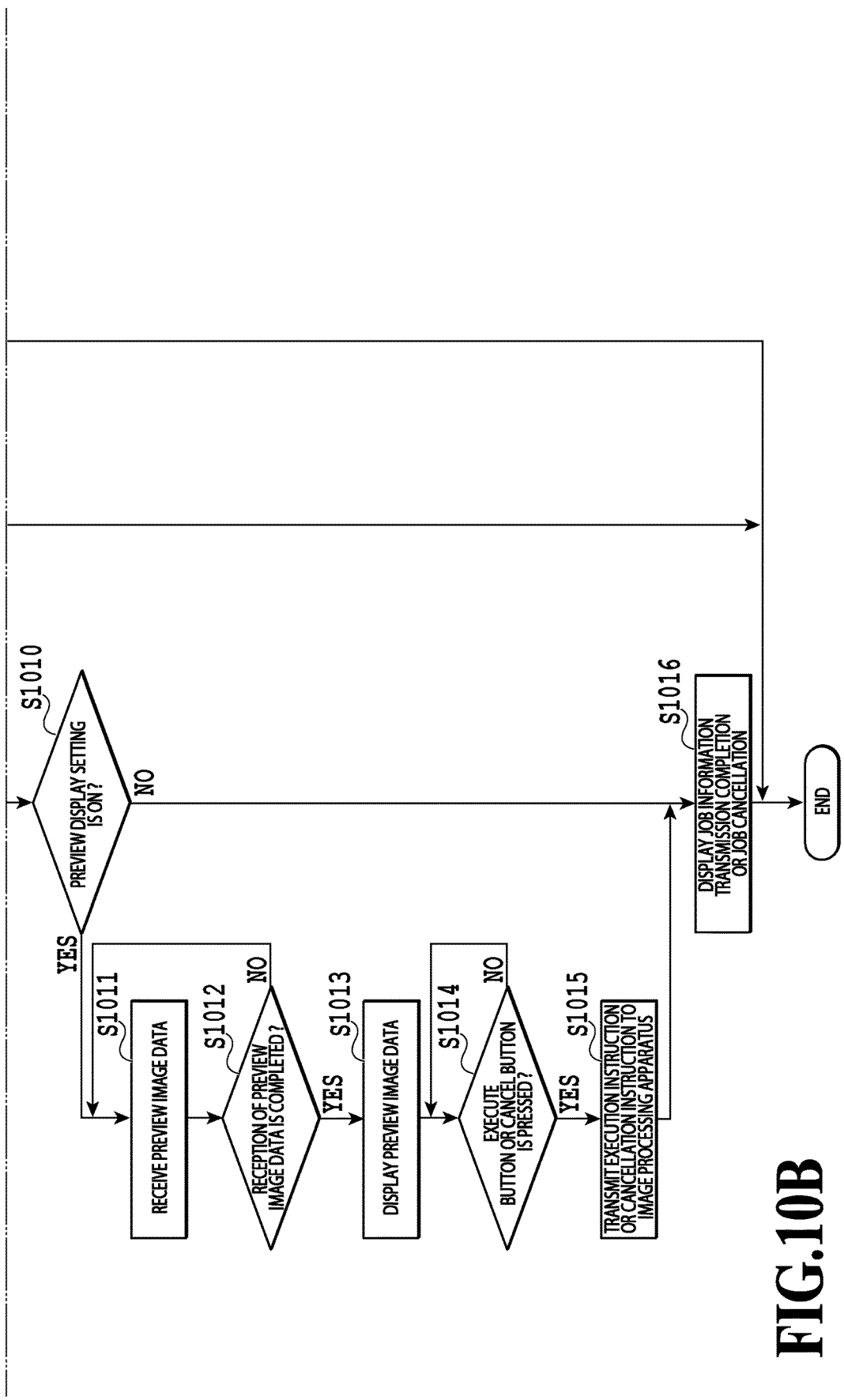
FIG. 10 is a diagram showing the relationship of FIGS. 10A and 10B, and FIGS. 10A and 10B are flowcharts showing job execution instruction processing performed by the information processing apparatus.

FIGS. 10A and 10B are flowcharts showing processing performed by the information processing apparatus 101 to transmit the job information to the image processing apparatus 104. The steps shown in the flowcharts in FIGS. 10A and 10B are implemented by the CPU 202 of the information processing apparatus 101 loading programs for implementing control modules stored in the ROM 203 or the storage apparatus 209 into the RAM 204 and executing the programs.

In the flowcharts shown in FIGS. 10A and 10B, the following case is taken as an example: after the network connection is established between the information processing apparatus 101 and the image processing apparatus 104 by the user operation, the information processing apparatus 101 transmits "scan-and-send" job information on the "scan-and-send" setting screen 901.

The type of the job information is not limited to this, and other types of the job information may be transmitted, such as the copy job information, the print job information, or the fax job information.

The "scan-and-send" job information includes the scan job and the email-sending job. The scan job is executed by the scan processing unit 521 of the image processing apparatus 104, and the email-sending job is executed by the email processing unit 525 of the image processing apparatus 104.

In a case of performing the processing in the flowcharts shown in FIGS. 10A and 10B, before logging in to the image processing apparatus 104, the user transmits the job information from the information processing apparatus 101 to the image processing apparatus 104.

In S1001, the UI control unit 402 receives, from the user, the email settings on the "scan-and-send" setting screen 901 in FIG. 9A and the scan settings on the scan setting screen 920 in FIG. 9B. After the settings are configured, the UI control unit 402 receives the user's pressing of the start button 909 on the "scan-and-send" setting screen 901, and the processing proceeds to S1002.

In S1002, the job control unit 407 performs the remote authentication for communicating with the image processing apparatus 104, using the authentication information managed by the authentication information management unit 403. The remote authentication refers to the authentication of whether to permit the communication of the job information between the information processing apparatus 101 and the image processing apparatus 104. The authentication information managed by the authentication information management unit 403 is transmitted to the image processing apparatus 104, and the image processing apparatus 104 performs the authentication based on the user information registered in the image processing apparatus 104 itself and returns, to the information processing apparatus 101, the result of the remote authentication. The processing then proceeds to S1003.

In S1003, the job control unit 407 determines the result of the remote authentication. In a case where the remote authentication was successful, the processing proceeds to S1005. In a case where the remote authentication was unsuccessful, the processing proceeds to S1004.

In a case where the remote authentication was successful, the information processing apparatus 101 remotely logs in to the image processing apparatus 104 with the user who is registered in the information processing apparatus 101. The remote login is different from the local login to be described later. The remote login brings the information processing apparatus 101 into a state of being able to transmit the job information to the image processing apparatus 104. Conceivable cases of the remote authentication being unsuccessful include the following examples: the apparatus settings of the image processing apparatus 104 have the setting to prohibit remote access from the information processing apparatus 101 or the authentication information managed by the authentication information management unit 403 is not consistent with the authentication information based on the user information.

In S1004, the UI control unit 402 displays a remote authentication error screen (not shown) on the operation unit 215, and the processing in the flowcharts shown in FIGS. 10A and 10B finishes.

In S1005, the network control unit 405 transmits the authentication information managed by the authentication information management unit 403 and the job information including the setting information such as the email settings and the scan settings to the image processing apparatus 104, and the processing proceeds to S1006. Here, the email settings are configured on the "scan-and-send" setting screen 901, and the scan settings are configured on the scan setting screen 920.

In S1006, the job control unit 407 determines whether an error has been received from the image processing apparatus 104. In a case where no error has been received, the processing proceeds to S1008. In a case where the error has been received, the processing proceeds to S1007. Conceivable examples of the error include a failure of the local authentication for the image processing apparatus 104 based on the user information included in the job information.

The local authentication refers to the processing for the authentication of the user who operates the operation panel 312 of the image processing apparatus 104 or the processing for logging in to the operation panel 312 of the image processing apparatus 104 from the user of the information processing apparatus 101 based on the user information included in the job information. In a case where the local authentication is successful, the user can use the operation panel 312 exclusively. In other words, the user can keep other users from using the operation panel 312 to perform a different operation.

In S1007, the UI control unit 402 displays a job transmission error screen (not shown) on the operation unit 215, and the processing in the flowcharts shown in FIGS. 10A and 10B finishes.

In S1008, the job control unit 407 obtains the status information on the image processing apparatus 104 from the job execution management unit 506, and the processing proceeds to S1009.

In S1009, the job control unit 407 determines, based on the status information obtained, whether the image processing apparatus 104 is currently in standby for the job execution. In a case where the image processing apparatus 104 is not currently in standby for the job execution, the processing proceeds to S1010. In a case where the image processing apparatus 104 is currently in standby for the job execution, the processing proceeds back to S1006. Being in standby for the job execution refers to the status of the image processing apparatus 104 between receiving the job information and actually starting the processing.

In S1010, the processing branches depending on the scan settings inputted in S1001. In a case where the preview switch 924 in the preview select area 923 is ON, the processing proceeds to S1011. In a case where the preview switch 924 in the preview select area 923 is OFF, the processing proceeds to S1016.

In S1011, the preview image data is received from the image processing apparatus 104, and the processing proceeds to S1012.

In S1012, the job control unit 407 determines whether the reception of the preview image data has been completed. In a case where the reception of the preview image data has not been completed, the processing proceeds back to S1011. In a case where the reception of the preview image data has been completed, the processing proceeds to S1013.

In S1013, the job control unit 407 displays the preview image data on the preview screen 930, and the processing proceeds to S1014.

In S1014, the job control unit 407 determines whether the execute button 934 or the cancel button 935 has been pressed. In a case where the execute button 934 or the cancel button 935 has been pressed, the processing proceeds to S1015. In a case where neither of the execute button 934 nor the cancel button 935 has been pressed, the processing in S1014 is executed again.

In S1015, in a case where it is determined in S1014 that the execute button 934 has been pressed, the job control unit 407 transmits an instruction to execute the processing that uses the image data generated by the image processing apparatus 104 to the image processing apparatus 104, and the processing proceeds to S1016. In a case where it is determined in S1014 that the cancel button 935 has been pressed, the job control unit 407 transmits a cancellation instruction to the image processing apparatus 104, and the processing proceeds to S1016.

In S1016, in a case where it is determined in S1014 that the execute button 934 has been pressed, the information processing apparatus 101 displays a job information transmission completion screen (not shown) on the operation unit 215, and the processing in the flowcharts shown in FIGS. 10A and 10B finishes. In a case where it is determined in S1014 that the cancel button 935 has been pressed, the information processing apparatus 101 displays a job cancellation screen (not shown) on the operation unit 215, and the processing in the flowcharts shown in FIGS. 10A and 10B finishes.

In the first embodiment, in order to obtain information such as the job execution status from the image processing apparatus 104, the user logged in from the information processing apparatus 101 remains logged in even after the completion of the processing in S1016.

Figure 11:
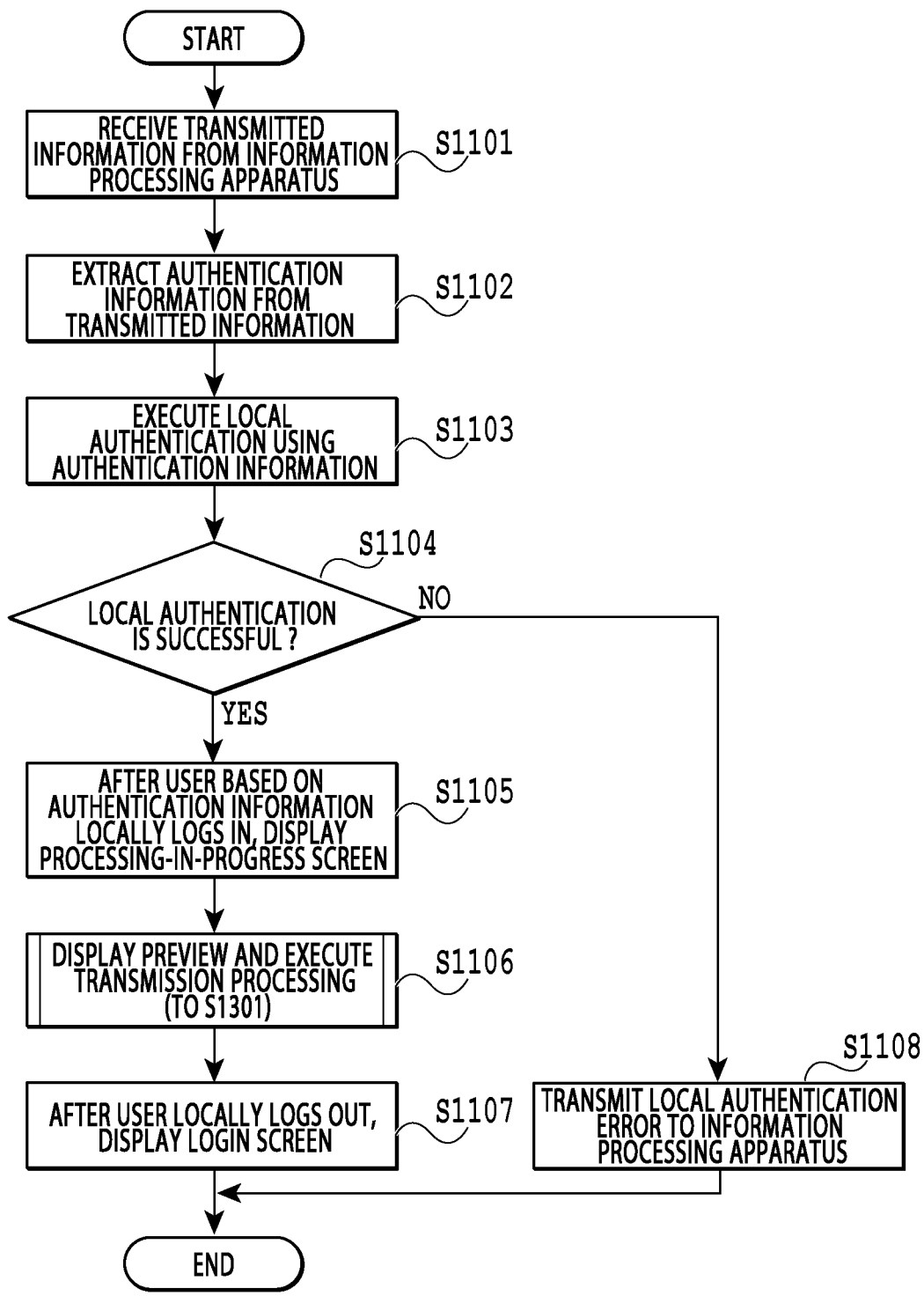
FIG. 11 is a flowchart showing job execution processing performed by the image processing apparatus.
Figure 12:
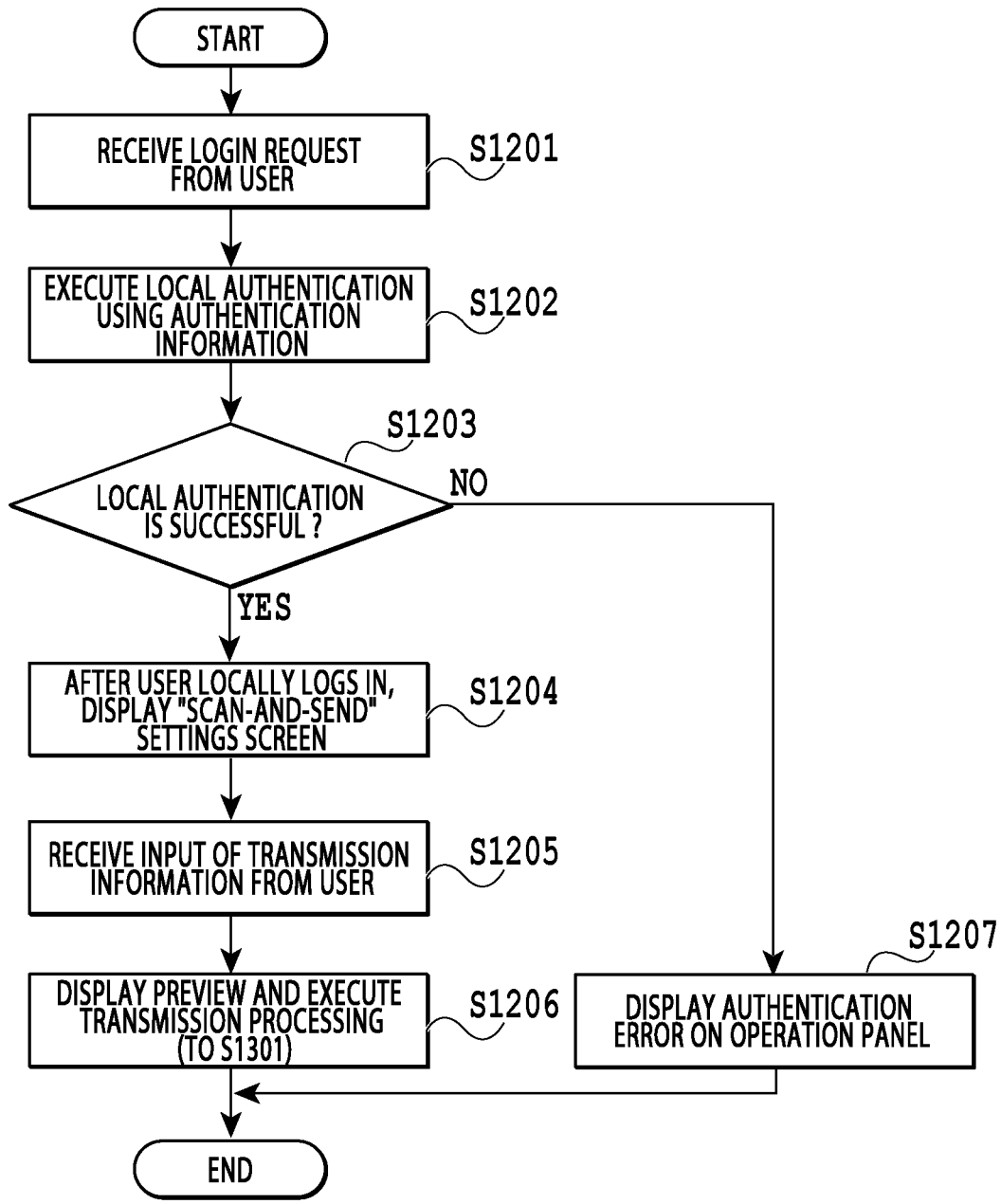
FIG. 12 is a flowchart showing the job execution processing performed by the image processing apparatus.
Figure 13:
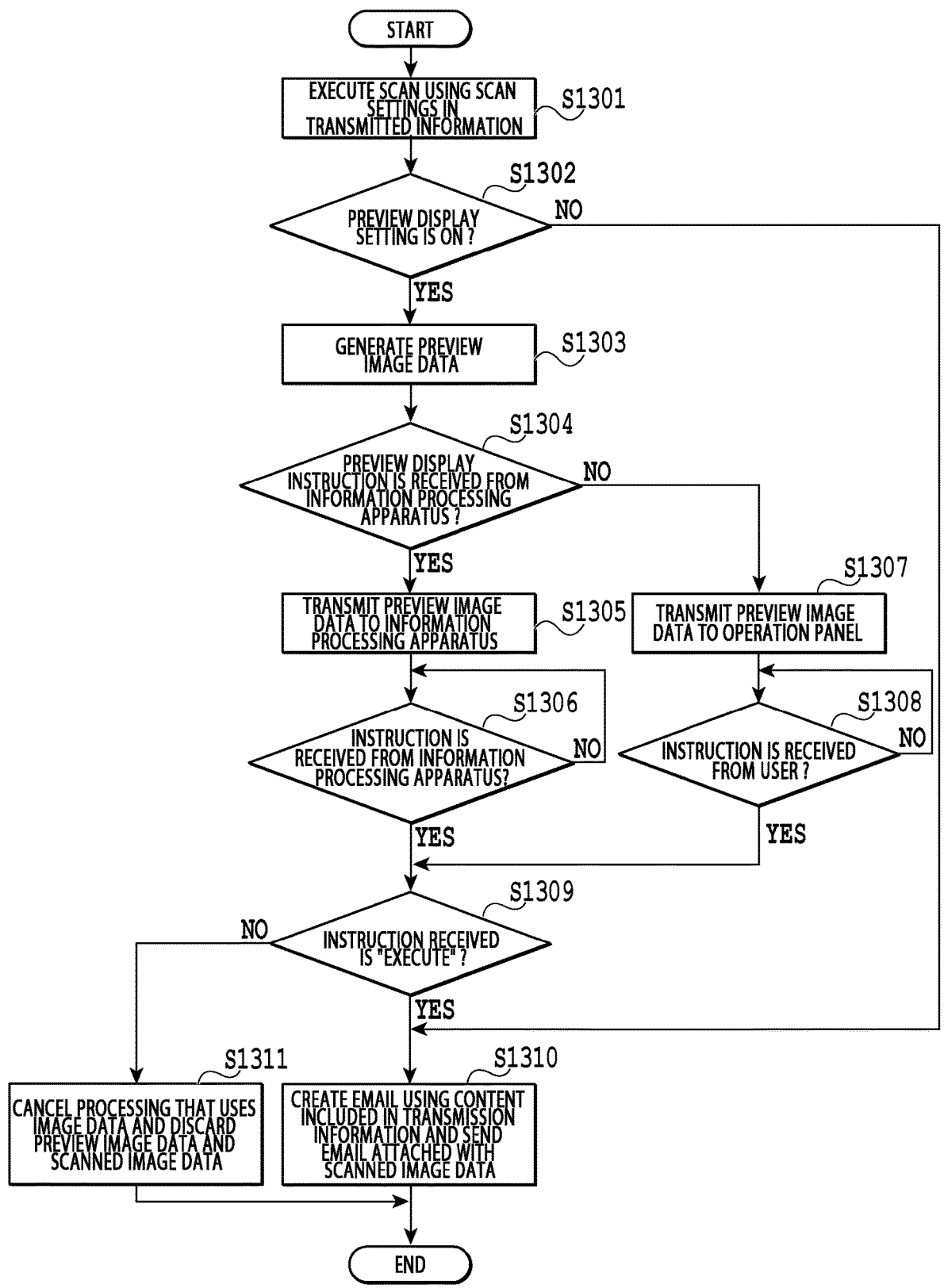
FIG. 13 is a flowchart showing the job execution processing performed by the image processing apparatus.

Next, the job execution processing performed by the image processing apparatus 104 is described using the flowcharts shown in FIGS. 11, 12, and 13.

FIG. 11 is a flowchart showing the "scan-and-email-send" processing performed by the image processing apparatus 104 after the image processing apparatus 104 receives the job information from the information processing apparatus 101. The steps shown in the flowchart in FIG. 11 are implemented by the CPU 302 by loading programs for implementing control modules stored in the ROM 304 or the HDD 305 into the RAM 303 and executing the programs.

The flowchart in FIG. 11 is started in a case where the image processing apparatus 104 receives job information transmitted from the information processing apparatus 101 in S1005 of the flowcharts shown in FIGS. 10A and 10B. Note that in the flowchart in FIG. 11, the following case is described as an example: the image processing apparatus 104 receives the "scan-and-send" job information from the information processing apparatus 101. Similar processing is performed in cases where the image processing apparatus 104 receives other types of the jobs from the information processing apparatus 101 as well.

In S1101, the image processing apparatus 104 receives the transmitted information from the information processing apparatus 101, and the processing proceeds to S1102.

In S1102, the authentication unit 503 extracts the authentication information from the job information received, and the processing proceeds to S1103.

In S1103, the authentication unit 503 executes the authentication for the user based on the authentication information to locally log in using the authentication information, and the processing proceeds to S1104.

In S1104, the authentication unit 503 determines whether the authentication for local login is successful. In a case where the local authentication is successful, the processing proceeds to S1105. In a case where the local authentication is unsuccessful, the processing proceeds to S1108.

In S1105, the user based on the authentication information locally logs in to the image processing apparatus 104. The UI control unit 502 displays the processing-in-progress screen 720 on the operation panel 312, and the processing proceeds to S1106.

In S1106, displaying the preview and the transmission processing to be described later are executed, and the processing proceeds to S1107.

In S1107, the locally-logged-in user of the information processing apparatus 101 locally logs out, and the processing in the flowchart shown in FIG. 11 finishes.

In S1108, the image processing apparatus 104 transmits a local authentication error to the information processing apparatus 101, and the processing in the flowchart shown in FIG. 11 finishes.

FIG. 12 is a flowchart showing the "scan-and-email-send" processing executed by the image processing apparatus 104. FIG. 12 is executed in a case where the image processing apparatus 104 receives the operation on the operation panel 312 from the user.

In S1201, a login request is received from the user via the operation panel 312, and the processing proceeds to S1202.

In S1202, the authentication unit 503 executes the authentication for the user based on authentication information to locally log in using the authentication information, and the processing proceeds to S1203.

In S1203, the authentication unit 503 determines whether the authentication for a local login is successful. In a case where the local authentication is successful, the processing proceeds to S1204. In a case where the local authentication is unsuccessful, the processing proceeds to S1207.

In S1204, the user based on the authentication information locally logs in to the image processing apparatus 104. The UI control unit 502 displays the "scan-and-send" setting screen 610 on the operation panel 312, and the processing proceeds to S1205.

In S1205, the input of the scan settings and the transmission information such as the destination email address are received from the user. In a case where the user presses the start button, the processing proceeds to S1206.

In S1206, displaying the preview and the transmission processing to be described later are executed, and the processing in the flowchart shown in FIG. 12 finishes.

In S1207, the UI control unit 502 displays a local authentication error screen (not shown) on the operation panel 312, and the processing in the flowchart shown in FIG. 12 finishes.

FIG. 13 is a flowchart showing the "scan-and-email-send" processing executed by the image processing apparatus 104. The processing in this flowchart is the processing corresponding to the processing in S1106 in FIG. 11 and the processing in S1206 in FIG. 12.

In S1301, the scan processing unit 521 of the job control unit 507 executes the scan using the scan settings included in the job information received, and the processing proceeds to S1302. In a case where the scan is executed, the image data generation unit 508 generates the scanned image data. In this event, the UI control unit 502 displays the processing-in-progress screen 720 on the operation panel 312.

In S1302, the job control unit 507 determines whether the preview display setting in the job information is ON or OFF. In a case where the preview display setting is ON, the processing proceeds to S1303. In a case where the preview display setting is OFF, the processing proceeds to S1310.

In S1303, the preview control unit 509 generates the preview image data from the image data generated by the image data generation unit 508, and the processing proceeds to S1304.

In S1304, the image processing apparatus 104 determines whether a preview display instruction is received from the information processing apparatus 101. In a case where the preview display instruction is received from the information processing apparatus 101, the processing proceeds to S1305. In a case where the preview display instruction is not received from the information processing apparatus 101, the processing proceeds to S1307.

In S1305, the image processing apparatus 104 transmits the preview image data to the information processing apparatus 101, and the processing proceeds to S1306. Upon receipt of the preview image data, the information processing apparatus 101 displays the preview image data on the operation unit 215.

In S1306, in a case where the image processing apparatus 104 receives the instruction from the information processing apparatus 101 in S1306, the processing proceeds to S1309. If no instruction is received from the information processing apparatus 101, the processing in S1306 is executed again, and the image processing apparatus 104 stands by to receive the instruction from the information processing apparatus 101.

Here, the instruction that the image processing apparatus 104 receives from the information processing apparatus 101 is either an execution instruction or a cancellation instruction. Because the user presses either one of the execute button 934 or the cancel button 935 displayed on the preview screen 930 shown in FIG. 9C, an instruction other than the execution instruction or the cancellation instruction is not transmitted from the information processing apparatus 101 to the image processing apparatus 104.

In S1307, the preview control unit 509 displays the preview image data on the operation panel 312, and the processing proceeds to S1308.

In S1308, in a case where the user presses the execute button 834 or the cancel button 835 on the preview screen 830 shown in FIG. 8, the execution instruction or the cancellation instruction is transmitted to the UI control unit 502 of the image processing apparatus 104. In this processing, the UI control unit 502 stands by to receive the execution instruction or the cancellation instruction. In a case where the UI control unit 502 receives the instruction, the processing proceeds to S1309. In a case where the UI control unit 502 does not receive the instruction, the processing in S1308 is executed again, and the UI control unit 502 stands by until the user presses the execute button 834 or the cancel button 835.

In S1309, the image processing apparatus 104 determines whether the instruction received is the execution instruction. In a case where the instruction received by the image processing apparatus 104 is an execution instruction, the processing proceeds to S1310. In a case where the instruction received by the image processing apparatus 104 is not the execution instruction but a cancellation instruction, the processing proceeds to S1311.

In S1310, the email processing unit 525 of the job control unit 507 creates an email based on the content included in the transmission information and sends the email attached with the scanned image data to a specified destination. The processing in the flowchart shown in FIG. 13 finishes.

In S1311, the image processing apparatus 104 cancels the processing that uses the image data and discards the preview image data and the scanned image data. The processing in the flowchart shown in FIG. 13 finishes.

In the flowchart in FIG. 13, the example that the preview image data is displayed in execution of the "scan-and-email-send" processing, is described.

In the first embodiment, in a case where the information processing apparatus 101 instructs to execute the job of the "scan-and-email-send" processing, the preview image data is displayed on the operation unit 215 of the information processing apparatus 101. In a case where the operation panel 312 of the image processing apparatus 104 is used to execute the job of the "scan-and-email-send" processing, the preview image data is displayed on the operation panel 312. Because the preview image data is displayed on the operation unit or the operation panel of the apparatus from which the user has instructed the job execution, the possibility that the user overlooks the preview image data, is decreased.

Also, there are needs that the user wants to execute the job not by touching the operation panel 312 of the image processing apparatus 104 but only by operating the information processing apparatus 101.

In a case of instructing the job execution from the information processing apparatus 101 using the approach according to the first embodiment, the user can complete the job execution only by operating the operation unit 215 of the information processing apparatus 101, without operating the operation panel 312 of the image processing apparatus 104.

In other words, the user can display the preview image data on the operation unit 215 of the information processing apparatus 101 without operating the operation panel 312 of the image processing apparatus 104. Thus, the usability in displaying the preview image data is improved.

Second Embodiment

In a case described in the first embodiment, the job execution is instructed from the information processing apparatus 101 or the image processing apparatus 104, and the preview image data is displayed on the apparatus that instructed the job execution. A second embodiment describes the processing performed in a case where the job execution is instructed from the information processing apparatus 101, and during the transmission of the preview image data from the image processing apparatus 104 to the information processing apparatus 101, the event that the transmission of the preview image data is interrupted, is addressed.

In a case where the information processing apparatus 101 instructs the job execution to the image processing apparatus 104, the image processing apparatus 104 executes the scan to generate the scanned image data and generates the preview image data from the scanned image data. Then, the image processing apparatus 104 transmits the preview image data to the information processing apparatus 101.

A transmission error may occur during the transmission of the preview image data from the image processing apparatus 104 to the information processing apparatus 101. Conceivable examples of such cases include a case where the application in the information processing apparatus 101 that is receiving the preview image data moves to background and cannot continue the data reception or a case where the transmission of the preview image data fails due to network disconnection.

Thus, in the second embodiment, upon occurrence of the transmission error during the transmission of the preview image data, the following processing is performed to allow the user to confirm the preview image data. Specifically, upon occurrence of the transmission error, the image processing apparatus 104 performs processing to display the preview image data on the operation panel 312. Further, the information processing apparatus 101 performs the processing to display, on the operation unit 215, a message screen prompting the user to confirm the operation panel 312 of the image processing apparatus 104.

Because the second embodiment has the same basic configuration as the first embodiment, only differences between the first embodiment and the second embodiment are described in the following description of the second embodiment.

Figures 14, 14A, 14B:
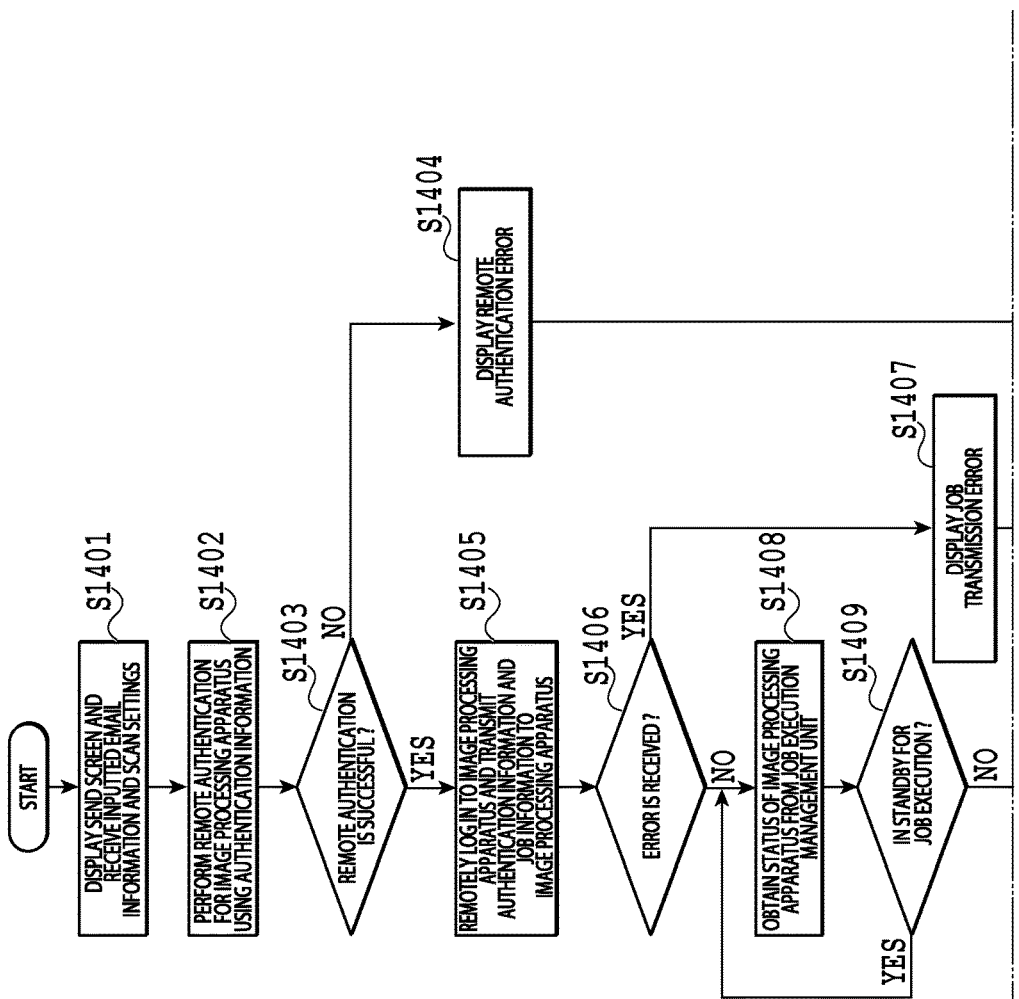
FIG. 14 is a diagram showing the relationship of FIGS. 14A and 14B, and FIGS. 14A and 14B are flowcharts showing processing performed in an event where reception of a preview image data fails.
Figure 14B:
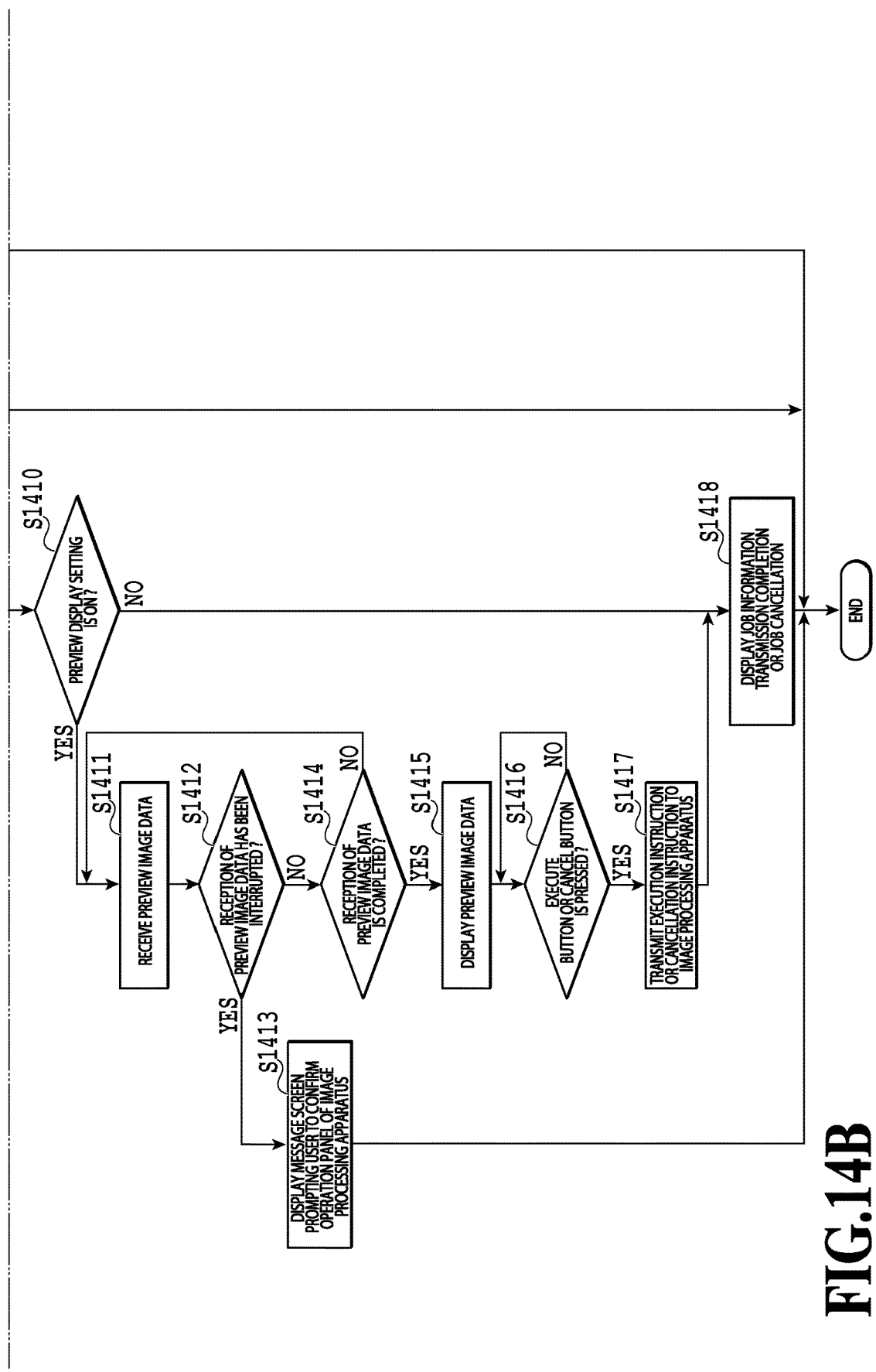

FIGS. 14A and 14B are flowcharts showing the processing executed by the information processing apparatus 101 in the event where the reception of the preview image data from the image processing apparatus 104 is interrupted.

The steps shown in the flowcharts in FIGS. 14A and 14B are implemented by the CPU 202 by loading programs for implementing control modules stored in the ROM 203 or the storage apparatus 209 into the RAM 204 and executing the programs. Because the flowcharts shown in FIGS. 14A and 14B have the same basic configuration as the flowcharts shown in FIGS. 10A and 10B, only differences between them are described.

Processing in S1401 to S1411 is the same as the processing in S1001 to S1011.

In S1412, the information processing apparatus 101 determines whether the reception of the preview image data has been interrupted during receiving the preview image data. In a case where the reception of the preview image data has been interrupted, the processing proceeds to S1413. In a case where the reception of the preview image data has not been interrupted, the processing proceeds to S1414.

In S1413, the information processing apparatus 101 displays, on the operation unit 215, a message screen (not shown) prompting the user to confirm the operation panel 312 of the image processing apparatus 104, and the processing in the flowcharts shown in FIGS. 14A and 14B finishes.

In S1414, the job control unit 407 determines whether the reception of the preview image data has been completed. In a case where the reception of the preview image data has not been completed, the processing proceeds back to S1411. In a case where the reception of the preview image data has been completed, the processing proceeds to S1415.

The processing in S1415 to S1418 is the same as the processing in S1013 to S1016. In a case where the processing in S1418 is completed, the processing in the flowcharts shown in FIGS. 14A and 14B finishes.

Figure 15A:
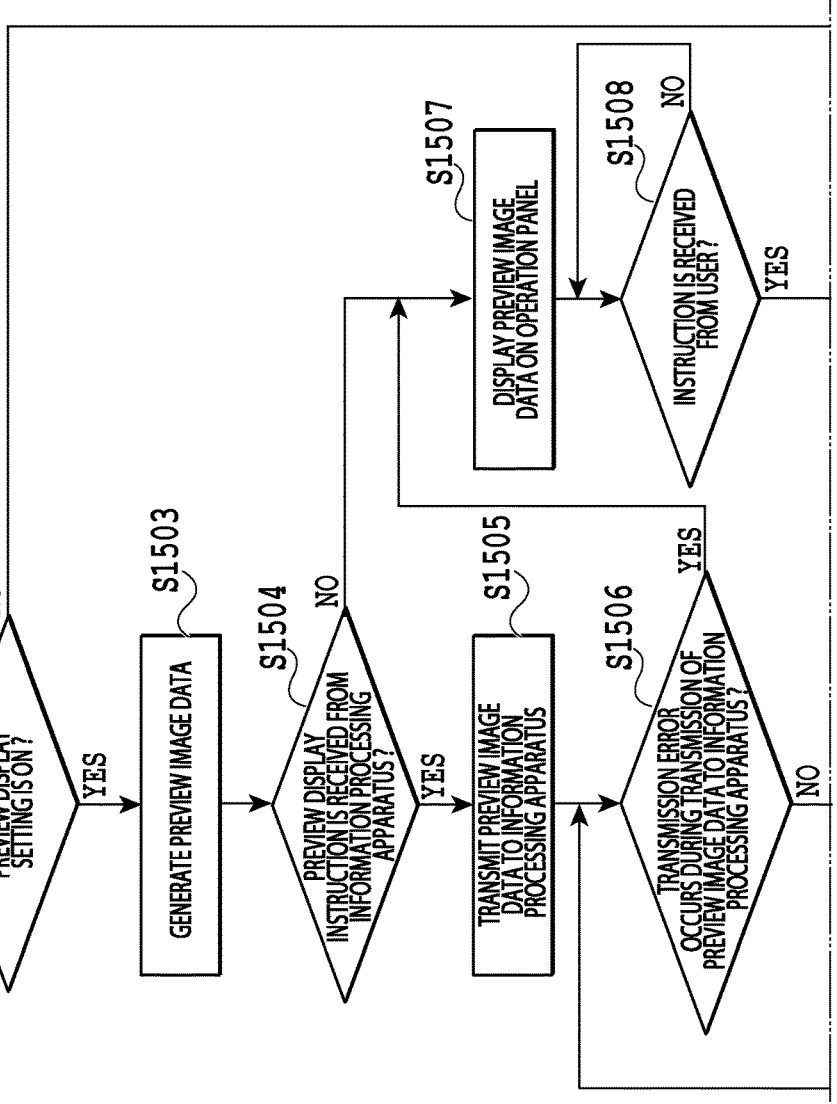
FIG. 15 is a diagram showing the relationship of FIGS. 15A and 15B, and FIGS. 15A and 15B are flowcharts showing processing performed in an event where transmission of the preview image data fails.
Figure 15B:
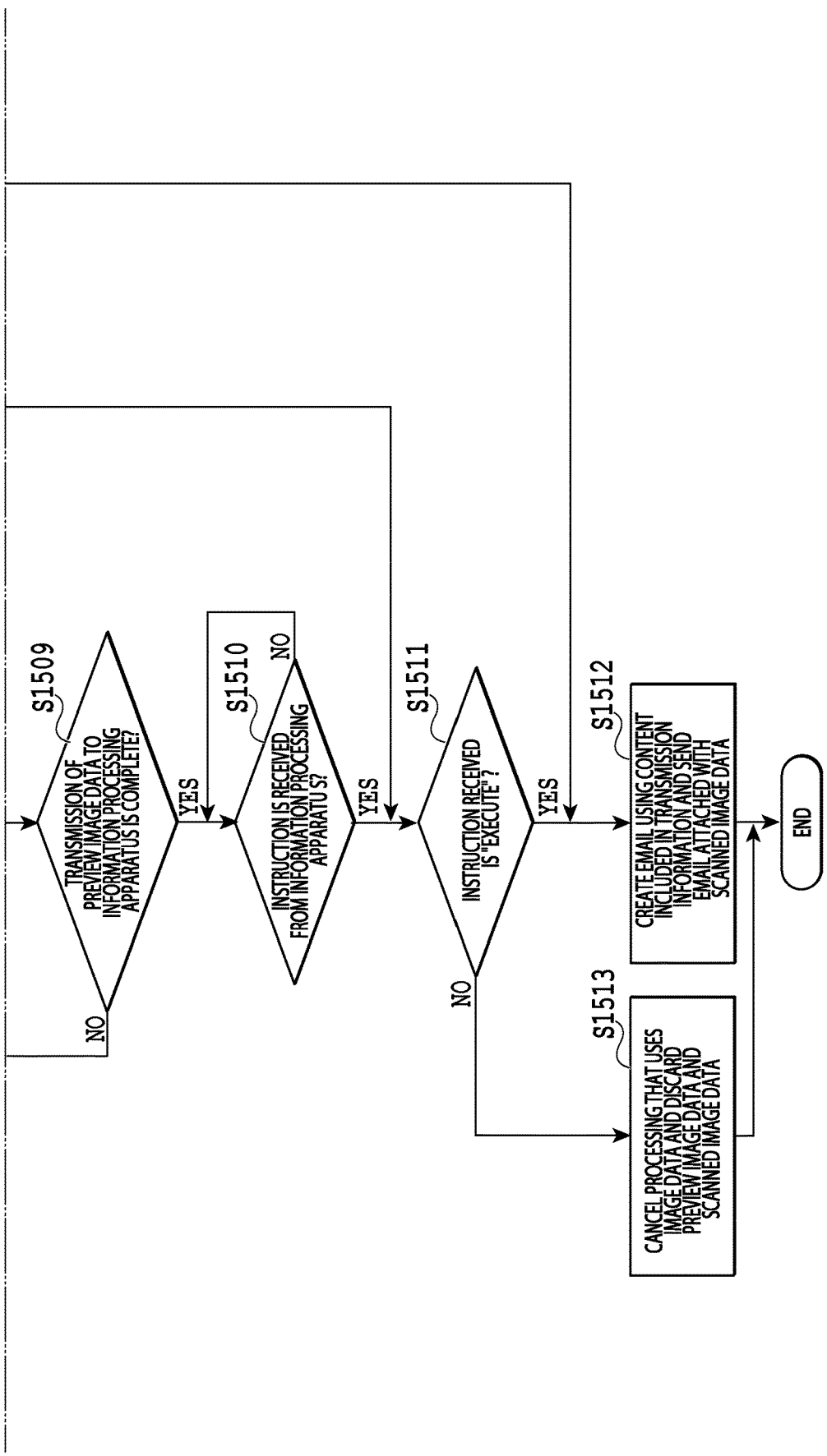

Next, the job execution processing executed by the image processing apparatus 104 is described using flowcharts shown in FIGS. 15A and 15B.

FIGS. 15A and 15B are the flowcharts showing the processing executed by the image processing apparatus 104 in the event where the transmission of the preview image data from the image processing apparatus 104 is interrupted.

The steps shown in the flowcharts in FIGS. 15A and 15B are implemented by the CPU 302 by loading programs for implementing control modules stored in the ROM 304 or the HDD 305 into the RAM 303 and executing the programs. Because the flowcharts shown in FIGS. 15A and 15B have the same basis configuration as the flowchart shown in FIG. 13, only differences between them are described.

The processing in S1501 to S1505 is the same as the processing in S1301 to S1305.

In S1506, the image processing apparatus 104 determines whether the transmission error has been occurred during the transmission of the preview image data to the information processing apparatus 101. In a case where the transmission error has been occurred, the processing proceeds to S1507. In a case where the transmission error has not been occurred, the processing proceeds to S1509.

In S1507, the preview control unit 509 displays the preview image data on the operation panel 312, and the processing proceeds to S1508.

In S1508, in a case where the user presses the execute button 834 or the cancel button 835 on the preview screen 830 shown in FIG. 8, the execution instruction or the cancellation instruction is transmitted to the UI control unit 502 of the image processing apparatus 104. In this processing, the UI control unit 502 stands by to receive the execution instruction or the cancellation instruction. In a case where the UI control unit 502 receives the instruction, the processing proceeds to S1511. In a case where the UI control unit 502 does not receive the instruction, the processing in S1508 is executed again, and the UI control unit 502 stands by until the user presses the execute button 834 or the cancel button 835.

In S1509, the image processing apparatus 104 determines whether the transmission of the preview image data to the information processing apparatus 101 has been completed. In a case where the transmission of the preview image data has been completed, the processing proceeds to S1510. In a case where the transmission of the preview image data has not been completed, the processing proceeds back to S1506.

In S1510, in a case where the image processing apparatus 104 receives the instruction from the information processing apparatus 101, the processing proceeds to S1511. In a case where the image processing apparatus 104 does not receive the instruction from the information processing apparatus 101, the processing in S1510 is executed again, and the image processing apparatus 104 stands by to receive the instruction from the information processing apparatus 101.

The processing in S1511 to S1513 is the same as the processing in S1309 to S1311, and after the processing in S1512 or the processing in S1513 is completed, the processing in the flowcharts shown in FIGS. 15A and 15B finishes.

The flowcharts in FIGS. 14 and 15 have been used to describe the processing performed to address the interruption of the transmission of the preview image data during transmitting the preview image data.

In a case where the transmission of the preview image data to the information processing apparatus 101 is interrupted during the transmission, the preview image data cannot be displayed on the information processing apparatus 101, and thus the image processing apparatus 104 displays the preview image data on the operation panel 312. Further, the information processing apparatus 101 displays, on the operation unit 215, a message screen (not shown) prompting the user to confirm the operation panel 312 of the image processing apparatus 104. Seeing the message screen, the user can confirm the preview image data on the operation panel 312 of the image processing apparatus 104.

Third Embodiment

In a case described in the first embodiment, the information processing apparatus 101 or the image processing apparatus 104 instructs the job execution, and the preview image data is displayed on the apparatus that instructed the job execution.

A third embodiment describes a case where the image processing apparatus 104 generates the preview image data to fit the resolution of the operation unit 215 of the information processing apparatus 101.

After the information processing apparatus 101 instructs the image processing apparatus 104 to execute the job, the image processing apparatus 104 transmits the preview image data to the information processing apparatus 101. In this event, in the processing in the first embodiment, the preview image data may be too large for the operation unit 215 of the information processing apparatus 101.

In a case where the data size of the preview image data is large, a larger volume of the network communication is required, and a longer time for the transmission is needed. Also, in the information processing apparatus 101 having the operation unit 215 with a low resolution, even in a case where the operation unit 215 displays high-resolution the preview image data, the low resolution screen to fit the resolution of the operation unit 215, is displayed.

Thus, in the third embodiment, a method for changing the resolution of the preview image data to fit the resolution of the operation unit 215 of the information processing apparatus 101 in the transmission of the preview image data to the information processing apparatus 101, is described. In a case where the information processing apparatus 101 has a low-resolution operation unit 215, the data size of the preview image data is decreased, resulting in reducing communication load.

Although the information for generating the preview image data is the resolution information in the third embodiment, the information on the image size displayed on the operation unit 215 may be used. The third embodiment has the same basic configuration as the first embodiment, and therefore only differences between the first embodiment and the third embodiment are described.

Figure 16B:
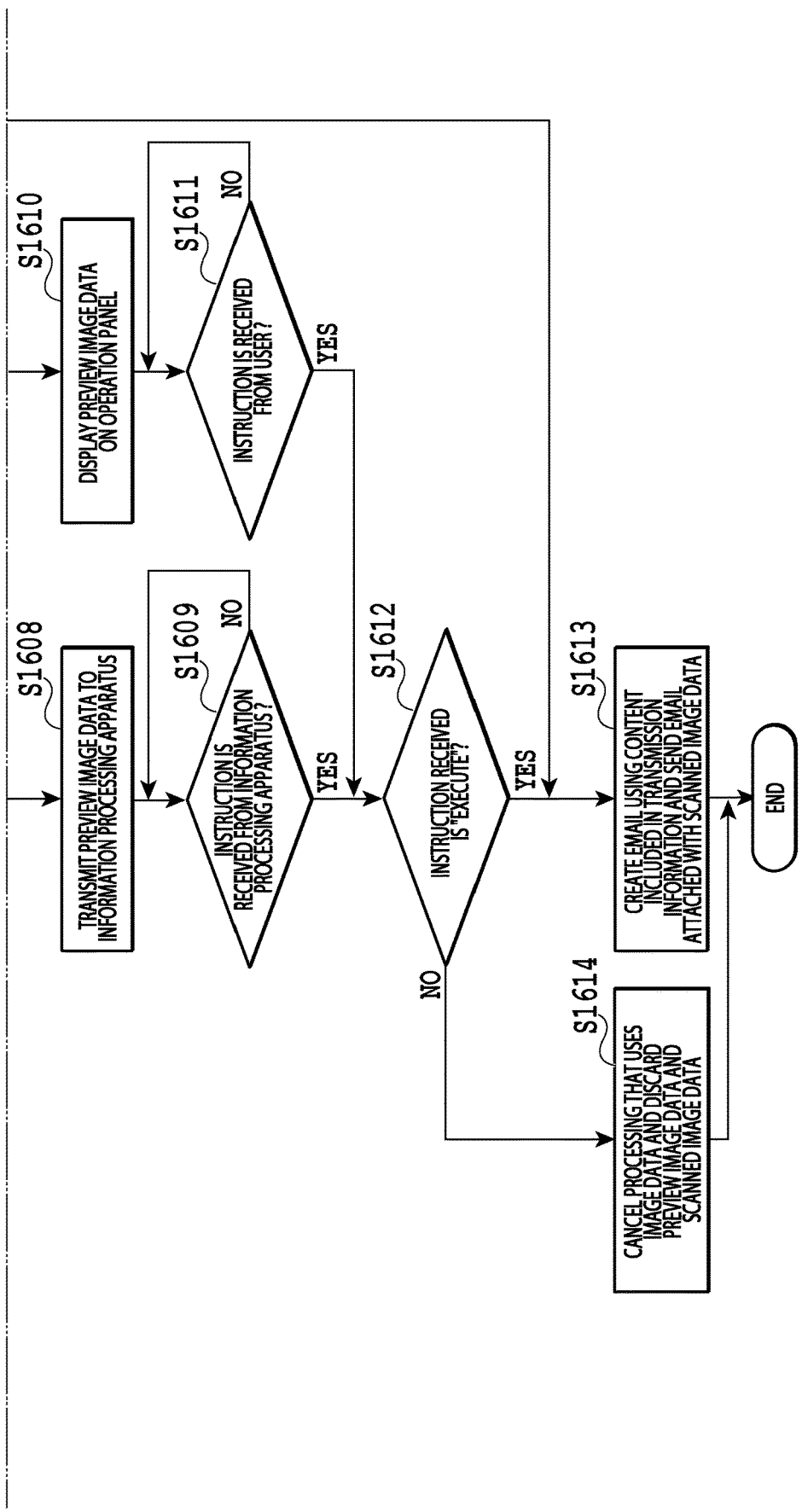
FIG. 16 is a diagram showing the relationship of FIGS. 16A and 16B, and FIGS. 16A and 16B are flowcharts showing processing to generate the preview image data depending on resolution.

FIGS. 16A and 16B are flowcharts showing the job execution processing performed by the image processing apparatus 104. The steps shown in the flowcharts in FIGS. 16A and 16B are implemented by the CPU 302 by loading programs for implementing control modules stored in the ROM 304 or the HDD 305 into the RAM 303 and executing the programs. Because the flowcharts shown in FIGS. 16A and 16B have the same basic configuration as the flowchart shown in FIG. 13, only differences between them are described.

Processing in S1601 and S1602 is the same as the processing in S1301 and S1302.

In S1603, the image processing apparatus 104 obtains the resolution information on the operation unit 215 of the information processing apparatus 101 from the transmitted information transmitted from the information processing apparatus 101, and the processing proceeds to S1604.

In S1604, the image processing apparatus 104 determines whether the resolution information on the operation unit 215 of the information processing apparatus 101 has been obtained. In a case where the resolution information on the operation unit 215 has been obtained, the processing proceeds to S1606. In a case where the resolution information on the operation unit 215 has not been obtained, the processing proceeds to S1605.

In S1605, the preview control unit 509 of the image processing apparatus 104 generates the preview image data with a prescribed resolution, and the processing proceeds to S1607.

In S1606, the preview control unit 509 of the image processing apparatus 104 generates the preview image data fitting the resolution information on the operation unit 215, and the processing proceeds to S1607.

The processing in S1607 to S1614 is the same as the processing in S1304 to S1311, and in a case where the processing in S1613 or the processing in S1614 is completed, the processing in the flowcharts shown in FIGS. 16A and 16B finishes.

The flowcharts shown in FIGS. 16A and 16B are used to describe the method for generating the preview image data fitting the resolution of the operation unit 215 of the information processing apparatus 101.

In a case where the operation unit 215 that displays the preview image data has the low resolution, or in a case where the image size displayed on the operation unit 215 is small, the network load for transmitting the preview image data to the information processing apparatus 101 can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-143743, filed Sep. 9, 2022, which is hereby incorporated by reference wherein in its entirety.

What is claimed is:

1. An image processing apparatus capable of communicating with an information processing apparatus, the image processing apparatus comprising:
   an operation panel;
   a reception unit configured to receive job information including a setting for displaying a preview from the information processing apparatus; and
   a control unit configured to transmit preview image data based on the job information to the information processing apparatus in a case of receiving the job information, wherein
   the control unit displays the preview image data on the operation panel in a case where the control unit fails to transmit the preview image data to the information processing apparatus.

2. The image processing apparatus according to claim 1, further comprising an image data generation unit configured to generate an image data obtained by executing a job in accordance with the job information.

3. The image processing apparatus according to claim 2, wherein
   the job information includes a setting indicating whether to display the preview,
   in a case where the job information includes the setting indicating to display the preview, the control unit transmits the preview image data corresponding to the image data to the information processing apparatus, and
   in a case where the job information includes the setting indicating not to display the preview, the control unit does not transmit the preview image data corresponding to the image data to the information processing apparatus.

4. The image processing apparatus according to claim 2, wherein,
   in a case where the reception unit receives an instruction to execute a processing that uses the image data from the information processing apparatus, the control unit executes the processing that uses the image data.

5. The image processing apparatus according to claim 2, wherein,
   in a case where the reception unit receives an instruction to cancel a processing that uses the image data from the information processing apparatus, the control unit cancels the processing that uses the image data and discards the image data and the preview image data.

6. The image processing apparatus according to claim 2, wherein
   the job information includes resolution information on an operation unit of the information processing apparatus or image size information on the preview image data which is displayed by the image processing apparatus, and
   in a case where there is a setting indicating that the information processing apparatus displays the preview, the control unit generates the preview image data from the image data based on the resolution information or the image size information.

7. A method for controlling an image processing apparatus including an operation panel and being capable of communicating with an information processing apparatus, the method comprising:
   receiving job information including a setting for displaying a preview from the information processing apparatus;

transmitting preview image data based on the job information to the information processing apparatus in a case of receiving the job information; and displaying the preview image data on the operation panel in a case where the preview image data is failed to be transmitted to the information processing apparatus.

8. An information processing apparatus capable of communicating with an image processing apparatus, the information processing apparatus comprising:

a transmission unit configured to transmit job information including a setting for displaying a preview to the image processing apparatus; and a preview control unit, in a case of receiving a preview image data based on the job information from the image processing apparatus, configured to display the preview image data, wherein, in a case where the image processing apparatus fails to transmit the preview image data to the information processing apparatus, the preview control unit displays a message screen to prompt a user to confirm an operation panel of the image processing apparatus, on an operation unit of the information processing apparatus.

9. The information processing apparatus according to claim 8, wherein the preview control unit displays a preview screen to display the preview image data, on the operation unit of the information processing apparatus.

10. The information processing apparatus according to claim 8, wherein the job information includes a setting indicating whether to display the preview, and in a case where the job information includes the setting indicating to display the preview and the preview image data based on the job information is received from the image processing apparatus, the preview control unit displays the preview image data.

11. The information processing apparatus according to claim 9, wherein an execute button is disposed on the preview screen, the execute button being for the image processing apparatus to execute a processing that uses an image data.

12. The information processing apparatus according to claim 11, wherein, in a case where the execute button is pressed, the transmission unit of the information processing apparatus transmits an instruction to execute the processing that uses the image data, to the image processing apparatus.

13. The information processing apparatus according to claim 9, wherein a cancel button is disposed on the preview screen, the cancel button being for the image processing apparatus to cancel processing that uses image data.

14. The information processing apparatus according to claim 13, wherein, in a case where the cancel button is pressed, the preview control unit discards the preview image data, and the transmission unit transmits an instruction to cancel the processing that uses the image data, to the image processing apparatus.

15. The information processing apparatus according to claim 8, wherein the job information includes resolution information on an operation unit of the information processing apparatus or image size information on the preview image data which is displayed by the information processing apparatus, and in a case where there is a setting indicating that the information processing apparatus displays the preview, the preview control unit receives the preview image data generated based on the resolution information or the image size information from the image processing apparatus, and displays the preview image data.

16. The information processing apparatus according to claim 8, wherein the information processing apparatus is a mobile terminal.

17. An image processing apparatus capable of communicating with an information processing apparatus, the image processing apparatus comprising:

a reception unit configured to receive job information including a setting for displaying a preview from the information processing apparatus;

a control unit configured to transmit preview image data based on the job information to the information processing apparatus in a case of receiving the job information; and an image data generation unit configured to generate an image data obtained by executing a job in accordance with the job information, wherein the job information includes resolution information on an operation unit of the information processing apparatus or image size information on the preview image data which is displayed by the image processing apparatus, and in a case where there is a setting indicating that the information processing apparatus displays the preview, the control unit generates the preview image data from the image data based on the resolution information or the image size information.

* * * * *